US012511546B2

(12) United States Patent
Amroabadi et al.

(10) Patent No.: US 12,511,546 B2
(45) Date of Patent: Dec. 30, 2025

(54) SYSTEM AND METHOD FOR MACHINE LEARNING ARCHITECTURE WITH DIFFERENTIAL PRIVACY

(71) Applicant: ROYAL BANK OF CANADA, Toronto (CA)

(72) Inventors: Sayedmasoud Hashemi Amroabadi, Toronto (CA); Ali Fathi, Toronto (CA); Layli Sadat Goldoozian, Toronto (CA)

(73) Assignee: ROYAL BANK OF CANADA, Toronto (CA)

( * ) Notice: Subject to any disclaimer, the term of this patent is extended or adjusted under 35 U.S.C. 154(b) by 883 days.

(21) Appl. No.: 17/085,835

(22) Filed: Oct. 30, 2020

(65) Prior Publication Data

US 2021/0133590 A1    May 6, 2021

Related U.S. Application Data

(60) Provisional application No. 62/928,031, filed on Oct. 30, 2019.

(51) Int. Cl.
*G06N 3/08* (2023.01)
*G06F 21/62* (2013.01)
*G06N 3/04* (2023.01)
*G06N 3/088* (2023.01)

(52) U.S. Cl.
CPC ......... *G06N 3/088* (2013.01); *G06F 21/6254* (2013.01); *G06N 3/04* (2013.01)

(58) Field of Classification Search
CPC ....... G06N 3/088; G06N 3/04; G06F 21/6254
USPC .......................................................... 706/25
See application file for complete search history.

(56) References Cited

U.S. PATENT DOCUMENTS

| 10,353,099 | B2 * | 7/2019 | Sassen .................. G01V 1/282 |
| 10,692,189 | B2 * | 6/2020 | Mentl ...................... G06T 5/60 |
| 10,746,567 | B1 * | 8/2020 | Bernau .................. G01D 4/002 |
| 2011/0173012 | A1 * | 7/2011 | Rettelbach ........... G10L 19/035 |
| | | | 704/226 |

(Continued)

FOREIGN PATENT DOCUMENTS

CN        110162993 A    *    8/2019

OTHER PUBLICATIONS

INSPEC Accession No. 14525936 An Adaptive Approach to Real-Time Aggregate Monitoring with Differential Privacy (Year: 2014).*

(Continued)

*Primary Examiner* — Taghi T Arani
*Assistant Examiner* — Pegah Barzegar
(74) *Attorney, Agent, or Firm* — Norton Rose Fulbright Canada LLP

(57) ABSTRACT

Differential private dictionary learning privatizes input data by training an autoencoder to learn a dictionary, the autoencoder including an encoder and a decoder, and weights of channels in a layer in the decoder defining dictionary atoms forming the dictionary; inputting the input data to the trained autoencoder; projecting, using the encoder, the input data on the learned dictionary to generate a sparse representation of the input data, the sparse representation including coefficients for each dictionary atom; adding noise to the sparse representation to generate a noisy sparse representation; and mapping, using the decoder, the noisy sparse representation to a reconstructed differentially private output.

20 Claims, 15 Drawing Sheets

(56) References Cited

U.S. PATENT DOCUMENTS

| | | | | |
|---|---|---|---|---|
| 2015/0189283 | A1* | 7/2015 | Wang | H04N 19/50 |
| | | | | 375/240.03 |
| 2016/0063164 | A1* | 3/2016 | Brillu | G06F 30/30 |
| | | | | 716/132 |
| 2017/0024864 | A1* | 1/2017 | Karande | G06T 7/11 |
| 2017/0035319 | A1* | 2/2017 | Zhao | A61B 5/0263 |
| 2018/0314985 | A1* | 11/2018 | O'Shea | G06N 20/00 |
| 2018/0322279 | A1* | 11/2018 | Beskorovajnov | G06F 16/221 |
| 2020/0090322 | A1* | 3/2020 | Seo | G06N 3/084 |
| 2021/0058229 | A1* | 2/2021 | Jiang | G06F 21/6245 |
| 2021/0074036 | A1* | 3/2021 | Fuchs | A61B 6/032 |
| 2021/0133590 | A1* | 5/2021 | Amroabadi | G06N 3/04 |
| 2021/0334658 | A1* | 10/2021 | Li | G06N 3/088 |
| 2022/0101126 | A1* | 3/2022 | Bharitkar | H04S 7/303 |
| 2022/0343691 | A1* | 10/2022 | Nakachi | G06V 10/94 |
| 2022/0365699 | A1* | 11/2022 | Akutsu | G06F 16/217 |
| 2023/0153580 | A1* | 5/2023 | Deng | G06N 3/082 |
| | | | | 706/15 |
| 2025/0190847 | A1* | 6/2025 | Ghazi | G06N 20/00 |
| 2025/0217508 | A1* | 7/2025 | Cherubin | G06N 7/01 |

OTHER PUBLICATIONS

Winner-Takes-All autoencoder (Year: 2015).*
Makhzani, Winner-Take-All-Autoencoder (Year: 2015).*
Malekzadeh, Replacement AutoEncoder: A Privacy-Preserving Algorithm for Sensory Data Analysis (Year: 2018).*
U.S. Appl. No. 17/085,835, filed Aug. 14, 2023, Royal Banck of Canada.
Kreutz-Delgado, Kenneth, et al. "Dictionary learning algorithms for sparse representation." Neural computation 15.2 (2003): 349-396.
Dwork C. (2006) Differential Privacy. In: Bugliesi M., Preneel B., Sassone V., Wegener I. (eds) Automata, Languages and Programming. ICALP 2006. Lecture Notes in Computer Science, vol. 4052. Springer, Berlin, Heidelberg.
Ramirez, Ignacio, Pablo Sprechmann, and Guillermo Sapiro. "Classification and clustering via dictionary learning with structured incoherence and shared features." 2010 IEEE Computer Society Conference on Computer Vision and Pattern Recognition. IEEE, 2010.
Dong, Weisheng, et al. "Sparsity-based image denoising via dictionary learning and structural clustering." CVPR 2011. IEEE, 2011.
Martin Abadi, Andy Chu, Ian Goodfellow, H. Brendan Mcmahan, Ilya Mironov, Kunal Talwar, and Li Zhang. Deep earning with differential privacy. Proceedings of the 2016 ACM SIGSAC Conference on Computer and Communications Security—CCS16 , 2016.
Frank D. McSherry. Privacy integrated queries: An extensible platform for privacy-preserving data analysis. In Proceedings of the 2009 ACM SIGMOD International Conference on Management of Data , SIGMOD '09, pp. 19-30, New York, NY, USA, 2009. ACM.
Mukherjee, Subhadip, Rupam Basu, and Chandra Sekhar Seelamantula. "(1-K-SVD: A robust dictionary learning algorithm with simultaneous update." Signal Processing 123 (2016): 42-52.
Tropp, Joel A. "Greed is good: Algorithmic results for sparse approximation." IEEE Transactions on Information theory 50.10 (2004): 2231-2242.
Jenatton, Rodolphe, et al. "Proximal Methods for Sparse Hierarchical Dictionary Learning." ICML. vol. 1. 2010.
Makhzani, Alireza, and Brendan Frey. "K-sparse autoencoders." arXiv preprint arXiv:1312.5663 (2013).
Makhzani, Alireza, and Brendan J. Frey. "Winner-take-all autoencoders." Advances in neural information processing systems. 2015.
McMahan, H. Brendan, and Galen Andrew. "A General Approach to Adding Differential Privacy to Iterative Training Procedures." arXiv preprint arXiv:1812.06210 (2018).
Barak, Boaz, et al. "Privacy, accuracy, and consistency too: a holistic solution to contingency table release." Proceedings of the twenty-sixth ACM SIGMOD-SIGACT-SIGART symposium on Principles of database systems. ACM, 2007.
Lyu, Min, Dong Su, and Ninghui Li. "Understanding the sparse vector technique for differential privacy." Proceedings of the VLDB Endowment 10.6 (2017): 637-648.
Rastogi, Vibhor, and Suman Nath. "Differentially private aggregation of distributed time-series with transformation and encryption." Proceedings of the 2010 ACM SIGMOD International Conference on Management of data. ACM, 2010.
Xiao, Xiaokui, Guozhang Wang, and Johannes Gehrke. "Differential privacy via wavelet transforms." IEEE Transactions on knowledge and data engineering 23.8 (2010): 1200-1214.
Li, Yang D., et al. "Compressive mechanism: Utilizing sparse representation in differential privacy." Proceedings of the 10th annual ACM workshop on Privacy in the electronic society. ACM, 2011.
Yang Cao and Masatoshi Yoshikawa and Yonghui Xiao and Li Xiong. Quantifying Differential Privacy under Temporal Correlations, IEEE 33rd International Conference on Data Engineering (ICDE), 2017.
Yves-Alexandre de Montjoye, Laura Radaelli, Vivek Kumar Singh, Alex "Sandy" Pentland. Unique in the shopping mall: On the reidentifiability of credit card metadata, Science, vol. 347, p. 536-539, 2015.
Dwork, Cynthia, Roth, Aaron. The The Algorithmic Foundations of Differential Privacy, Found. Trends Theor. Comput. Sci, vol. 9, No. 3-4, p. 211-407, 2014.
Greg Kirczenow, Masoud HAshemi, Ali Fathi, Matt Davison. Machine Learning for Yield Curve Feature Extraction: Application to Illiquid Corporate Bonds , ArXiv, , 1812.01102, 2018.
Yang D. Li, Zhenjie Zhang, Marianne Winslett, Yin Yang. Compressive mechanism: utilizing sparse representation in differential privacy , ArXiv, , 1107.3350, 2011.
Aharon Michal, Michael Elad. Overcomplete dictionaries for sparse representation of signals—PhD Dissertation , 2006.
A. R. Vijaya Narayanan, Joanna Huey, Edward W. Felten. A Precautionary Approach to Big Data Privacy , 2016.
Andrew Ng. Sparse autoencoder, CS294A Lecture notes, vol. 72, 2011.
Irina Rish, Genady Grabarnik. Sparse Modeling: Theory, Algorithms, and Applications, CRC Press, 2014.
Luc Rocher, Julien M. Hendrickx, Yves-Alexandre de Montjoye. Estimating the success of re-identifications in incomplete datasets using generative models, Nature Communications, vol. 10, 2019.
Latanya Sweeney. Simple Demographics Often Identify People Uniquely, Working paper, 2000.
Guangliang Chen, Deanna Needell. Compressed sensing and dictionary learning, Proceedings of Symposia in Applied Mathematics , vol. 73, 2016.
Michal Aharon, Michael Elad. Overcomplete dictionaries for sparse representation of signals, Computer Science Department, Technion, 2006.
Emmanuel J Candes, Michael B Wakin, An introduction to compressive sampling, IEEE signal processing magazine, vol. 25, 2008.
Ilya Mironov, Renyi differential privacy, 2017 IEEE 30th Computer Security Foundations Symposium (CSF), 2017.
Diederik P Kingma, Jimmy Ba, Adam: A method for stochastic optimization, arXiv preprint arXiv:1412.6980, 2014.

* cited by examiner

320

Train an autoencoder to learn a dictionary, the autoencoder including an encoder and a decoder, and weights of channels in a layer in the decoder defining dictionary atoms forming the dictionary
321

Input an input data to the trained autoencoder
322

Project the input data on the learned dictionary to generate a sparse representation of the input data, the sparse representation including coefficients for each dictionary atom
323

Add noise to the sparse representation to generate a noisy sparse representation
324

Map the noisy sparse representation to a reconstructed differentially private output
325

FIG. 3B

| Forward Sortation Area | Region Name | Merchant Count | Transaction Count (4 mth) |
|---|---|---|---|
| M2K | Bayview Village North York | 775 | 169,431 |
| M2N | Willowdale North York | 2154 | 1,687,384 |
| M5A | Regent Park, Harbourfront | 1763 | 267,808 |
| M5B | Garden District, Ryerson | 2716 | 662,103 |

FIG. 10

SYSTEM AND METHOD FOR MACHINE LEARNING ARCHITECTURE WITH DIFFERENTIAL PRIVACY

CROSS-REFERENCE TO RELATED APPLICATION(S)

This application claims priority from U.S. Provisional Patent Application No. 62/928,031 filed on Oct. 30, 2019, the entire contents of which are hereby incorporated by reference herein.

FIELD

This disclosure relates to data privacy, and in particular, differential privacy.

BACKGROUND

Customers' data privacy is a serious concern in the machine learning era. Machine learning algorithms can be data hungry and may require a large amount of training data. In creating useful models, customer data may be used as training data. However, such models may expose sensitive data that they are trained on, thus exposing customer data.

SUMMARY

According to an aspect, there is provided a computer-implemented method for privatizing input data, the method comprising: training an autoencoder to learn a dictionary, the autoencoder including an encoder and a decoder, and weights of channels in a layer in the decoder defining dictionary atoms forming the dictionary; inputting the input data to the trained autoencoder; projecting, using the encoder, the input data on the learned dictionary to generate a sparse representation of the input data, the sparse representation including coefficients for each dictionary atom; adding noise to the sparse representation to generate a noisy sparse representation; and mapping, using the decoder, the noisy sparse representation to a reconstructed differentially private output.

In some embodiments, the training comprises optimization of a stochastic gradient descent.

In some embodiments, the training comprises an Adam stochastic optimization.

In some embodiments, the training comprises regularizing weights of the decoder by setting weights non-negative when a signal is non-negative.

In some embodiments, the training comprises regularizing weights of decoder by minimizing a norm of the weights.

In some embodiments, the training comprises adding noise at each step of optimization while learning the dictionary.

In some embodiments, the training comprises adding random Gaussian noise at an input layer of the decoder.

In some embodiments, the training is performed using private training data.

In some embodiments, the method further comprises adding noise to the learned dictionary.

In some embodiments, the noise has a Laplace distribution.

In some embodiments, the noise is added using a Laplace Perturbation Algorithm.

In some embodiments, a parameter of the Laplace Perturbation Algorithm is calibrated according to a sensitivity of the input data.

In some embodiments, the autoencoder is a sparse autoencoder.

In some embodiments, the autoencoder is a Winner Takes All autoencoder.

In some embodiments, the method further comprises applying a threshold on the sparse representation to increase sparsity.

In some embodiments, the encoder comprises one-dimensional convolutional layers.

In some embodiments, the decoder comprises one-dimensional convolutional layers.

In some embodiments, the input data comprises time-series data.

According to another aspect, there is provided a computer system comprising: a processor; a memory in communication with the processor, the memory storing instructions that, when executed by the processor cause the processor to perform a method as disclosed herein.

According to a further aspect, there is provided a non-transitory computer-readable medium having computer executable instructions stored thereon for execution by one or more computing devices, that when executed perform a method as disclosed herein.

Other features will become apparent from the drawings in conjunction with the following description.

BRIEF DESCRIPTION OF DRAWINGS

In the figures which illustrate example embodiments,

FIG. 3B is a flow chart of a method for privatizing input data, according to an embodiment;

FIG. 10 is a table summarizing some characteristics of the data of FIG. 8, according to an embodiment;

DETAILED DESCRIPTION

Figure 1:
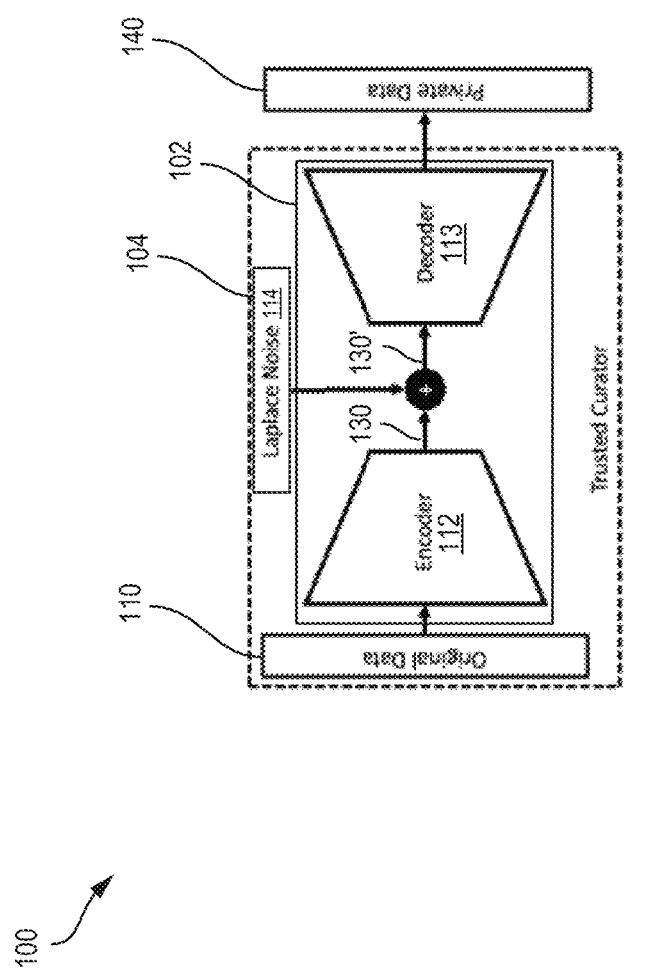
FIG. 1 is a schematic of a differential privacy dictionary learning system, according to an embodiment.

Collections of large data sets consisting of human behavioral data, such as personal credit cards transactions and location-temporal historical data, sometimes named as "alternative data", is now common practice in investment banking and capital markets to gain insights about consumer behaviour and their effect on corporate revenues, credit quality and future equity prices. Many types of behavioural data are produced by costumer use of various technologies such as cell phones, social media, navigation devices, and the like, and therefore may contain revealing information about private aspects of an individual's life.

While data may be used which is aggregated and is free of personally identifiable information (PII) such as names, addresses, social insurance numbers, etc., there still exist considerable concerns within the industry regarding the potential risk arising from using this data. Since the pioneering work of Sweeney ([31]), there has been mounting evidence showing that a de-identified data set with no PII, is not necessarily anonymous and therefore it is not safe to be released to the public and to third parties (see [21], [22], [27] and [30]).

Customer data privacy is a rising concern particularly in the context of machine learning, due to the risk of model memorization, training data privacy, and data sharing concerns.

The above referenced shortcomings of common de-identification methods has lead to the notion of provable privacy. Provable privacy can be characterized as data processing protocols based on quantifiable definitions of privacy, providing guarantees which can withstand potential future advances in data and data mining (which could be leveraged by the privacy adversary) and at the same time, also maintaining the utility of the resulting data product for the downstream use. Among such methods, differential privacy (also referred to as "DP" herein) ([22]) is currently considered as the gold standard for data release with privacy guarantees. To provide privacy protection to data (for example, customer data), private algorithms may be used, such as differentially private algorithms as described herein.

Differential privacy (also referred to as "DP" herein) is a property of a data releasing mechanism which requires that presence of a particular individual's data in a dataset must have a limited effect on the output of any output resulting from the analysis of the data. Differential privacy is usually achieved by injecting calibrated noise to the releasing mechanism outputs. The effect of including a particular individual's data in the dataset can be controlled by the privacy budget parameter E which controls the magnitude of the injected noise to the mechanism. The process of achieving differential privacy may differ depending on the type of releasing mechanism, however, the privacy objective remains the same.

In an example, differential privacy may allow for datasets or databases to be queried, and data or information from the dataset released, by describing the patterns of data within the dataset and withholding information about individuals in the dataset. Differential privacy may provide privacy of customer data, for sharing or used for training models. Differential privacy can be used for making data (such as customer information) private, meaning that the data is not identifiable.

Differential privacy may also provide privacy against an adversary (or a malicious user) that has arbitrary prior knowledge.

Differential privacy ([2]) may solve problems that arise when three factors are present: (1) sensitive data, (2) curators who need to release statistics, and (3) adversaries who want to recover the sensitive data.

Many different differential privacy mechanisms have been proposed including LAP ([14]), SVT ([15]). These methods either need a very high privacy budgets which reduces the utility and therefore the usability of the signal or are limited to specific applications. Two more general competitive mechanisms are Fourier transform based mechanism ([16], [17]) and compressed sensing based mechanism ([18]).

In achieving DP, there is an inherent trade-off between the strength of the privacy guarantees and the utility of the resulting private data. While larger noise magnitude can improve privacy, it also reduces the usefulness of the outputs. In the cross sectional data with Independent Identically Distributed (IID) samples, this problem is studied in existing DP implementations (see [22]), however, the taxonomy of the existing datasets in practical applications is vast and includes diverse classes of data such as time series, longitudinal, geo-temporal, and the like, based on the employed data collection strategies.

Formal privacy such as differential privacy that can work well for cross sectional data, may seem too difficult to achieve for time series data using traditional techniques. For instance, standard differentially private techniques can result in adding large amount of noise to each query answer, making the query answers practically useless if a long sequence of queries is to be answered (see [22], [19]). In [16], Fourier Perturbation Algorithm (FPA), a variant of DP for time series data was introduced which leverages the potential sparsity of time series signals in the frequency domain in order to inject noise and hence provide DP guarantees while maintaining better data utility. A limitation of this method is that the latent features captured by the algorithm (to which Laplacian noise is injected) are fixed Fourier basis and hence do not depend on the data, and when noise is added, the quality of signal can drop significantly.

In some embodiments of the present disclosure, FPA framework is extended by learning latent features of data by sparse coding and dictionary learning techniques.

For traditional differential privacy techniques such as FPA and Laplace Perturbation Algorithm (LPA), the utility error bound is $O(\sqrt{n}/\epsilon)$. in [25] a Compressed Sensing (CS)-based mechanism is used to reduce the error bound to $O(\log n/\epsilon)$.

Using a DP-mechanism, with embodiments disclosed herein, with lower error bound may allow the privacy budget (using larger amounts of noise) to increase without losing useful information of the private data.

To provide a smaller error bound in compressive-mechanism, measured signals (such as measured time-series data) may be sparse or must be represented in a sparse domain. In [25], different sparsifying transformations, such as discrete cosine and wavelet transformation, have been used for different use cases. Using a general purpose transformation may not provide an optimum sparse representation, resulting in a sub-optimal compressive-mechanism.

In an example use case of releasing some statistics from a sensitive database, an adversary may want to know sensitive data, in an example, the number of people who have a bad credit rating. Instead of revealing the ground truth, an algorithm may be used that returns the ground truth, e.g., N=3, plus some random noise.

Adding (or "injecting") random noise to a ground truth may achieve differential privacy. A random number L may be chosen from a zero-centered Laplace distribution; and the value of N+L is returned.

Since differential privacy mechanisms may require a tradeoff between utility and privacy, it may be desirable to provide protections available from a differential privacy mechanism while maintaining a higher utility, which may enable more accurate models with the same level of privacy and improve the quality of private data.

Differential privacy may be achieved by injecting random noise into statistical query results. Beyond correctness, a goal in the design of a differentially private mechanism may be to reduce the effect of random noise, ensuring that the noisy results can still be useful.

Differential privacy mechanisms can be applied to sparsely represented data as disclosed herein. Such sparsely represented data may be generated by machine learning architecture such as sparse dictionary learning techniques applied to data sets, for example, time-series data or sequential data.

Embodiments of systems and methods disclosed herein may be based on data-driven sparse dictionary learning methods (for example, [20], [11], [26], [29]) which are capable of learning faithful sparse high level representations (dictionaries) from a given dataset. Once the dictionaries are learned, sparse representations can be perturbed by calibrated Laplace noise so that when the original data is recovered, DP within the pre-specified privacy budget is provided.

As disclosed herein, benchmarking experimentation performed on a real use-case data involving the time series of aggregated credit cards transactions at merchants located at dense regions within the Toronto metropolitan area demonstrates the advantages of systems and methods disclosed herein, as compared with the cross sectional Laplace mechanism and FPA algorithm in achieving a higher level of data utility while providing similar differential privacy.

Systems and methods disclosed herein introduce a technique for differentially private release of aggregate time series queries, based on techniques of dictionary learning and sparse coding.

Conveniently, by learning high level sparse patterns from the time series data, embodiments disclosed herein may be capable of injecting Laplacian noise in way that maintains differential privacy while preserving a higher amount of data utility. By using dictionary learning techniques described herein, it may be possible to lower the number of elements. With fewer elements in a sparse representation, there are thus fewer elements to add noise to, lowering the amount of noise that needs to be added to achieve desired privacy which may result in an increased accuracy of a reconstructed signal in the form of private data.

Performance of embodiments disclosed herein has been compared against the naive Laplace mechanism as well as Fourier Perturbation Algorithm (FPA) on a real use case of aggregate time series of credit card transactions at merchants located in dense areas within a city, as described in further detail below.

In some embodiments, a trusted curator that controls a database from which it must publish population statistics may be modeled. A database may be presented as a matrix with known properties, and published statistics, called queries, as functions of the data matrix. These queries can represent statistics such as contingency tables and other standard data products (such as statistical model parameters or outputs).

In some embodiments, a population database can be represented as a matrix, D. Each row of D contains information for one of N individuals, and each column records a separate variable or feature. D is a multi-set with rows selected from a discrete, finite-valued data domain, $\chi$. The cardinality of $\chi$ is denoted by $|\chi|$. Such a setup may be very general and can handle missing data, non-response, skip patterns, alternative sources, unique identifiers, and other complex features of real data.

A histogram representation of D can be a $|\chi| \times 1$ vector, $x \in \mathbb{Z}*^{|\chi|}$, where $\mathbb{Z}*$ is the set of non-negative integers. The histogram records the frequency of each feasible combination of attributes in D. For each element of the data domain, $k \in \chi$, $x_k$ is the number of records in D with attribute combination k. The ordering of $k \in \chi$ is fixed and known, but arbitrary. The $l_1$ norm of x is $\|x\|_1 = \Sigma_1^{|\chi|} |x_i| = N$, the number of records in the database. Given two histograms x and y, $\|x-y\|_1$ measures the number of records that differ between x and y. Adjacent histograms are those for which the $l_1$ distance is 1.

Population statistics are functions that map the data histogram to an output range R. A database query is q: $\mathbb{Z}*^{|\chi|} \rightarrow R$. q(x) can be referred to as the exact query answer. The sensitivity of a query measures the maximum amount by which the exact answer can change when D changes by the addition or removal of exactly one row. The l1 sensitivity for query q is defined as:

$$\Delta q = \max_{x,y \in \mathbb{Z}*^{|\chi|}, \|x-y\|_1 \leq 1} |q(x) - q(y)|. \quad (1)$$

Sensitivity can be defined as a worst-case measure of how much information a given query can reveal and can play an important role in the analysis of privacy.

In an example, a database curator may want to publish answers to a query workload, $Q(\cdot) = \{q_1(\cdot), \ldots, q_k(\cdot)\}$. The exact answer to the query workload on the histogram x is a set $Q(x) = \{q_1(x), \ldots, q_k(x)\}$. In the absence of privacy concerns, the curator would publish Q(x). In a computer science approach to privacy, the data publication mechanism is modeled as a probabilistic function. Let $\mathcal{F}$ be the set of allowable query workloads. A data publication mechanism is a random function $M: \mathbb{Z}*^{|\chi|} \times \mathcal{F} \rightarrow R$ whose inputs are a histogram $x \in \mathbb{Z}*^{|\chi|}$ and a workload $Q \in \mathcal{F}$, and whose random output is an element of range R. For $B \in \mathcal{B}$, where $\mathcal{B}$ are the measurable subsets of R, the conditional probability is $Pr[M(x, Q) \in B | x, Q]$, given x and Q, where the probabilities are only over the randomness induced by the mechanism.

A differentially private mechanism can be defined as follows.

A "Definition 1" for differential privacy can be defined as: data publication mechanism M satisfies $\epsilon$-differential privacy if for all $\epsilon > 0$, all x, $x' \in N_x$ and all $B \in \mathcal{B}$, $$Pr[M(x) \in B|x] \leq e^\epsilon Pr[M(x') \in B|x'], \quad (2)$$

where $N_x = \{(x,x'), s.t. x, x' \in \mathbb{Z}*^{|\chi|} \text{ and } \|x-x'\|_1 = 1\}$ is the set of all adjacent histograms of x, and the probabilities are taken only over the randomness in the mechanism.

Differential privacy can be achieved by adding random noise to the answers, where the noise distribution is carefully calibrated to the query. Calibration can depend on the query sensitivity.

A Laplace Perturbation Algorithm (LPA) can add suitably-chosen noise to the true answers. The noise is generated according to the Laplace distribution. Lap($\lambda$) can be denoted as a random variable drawn from the Laplace distribution. The distribution Lap(λ) has mean 0 and variance $2\lambda^2$ with the following density, $$Pr(Lap(\lambda) = z) = \frac{1}{2\lambda} e^{-\epsilon|z|/\lambda}. \quad (3)$$

A "Theorem 1" can be defined as: LPA(q, λ) is ϵ-differentially private for $\lambda = \Delta(q)/\epsilon$. A proof can be found in [22].

Mechanisms satisfying Definition (1) can have several important properties. Differentially private mechanisms may be robust to post-processing, meaning that a privacy guarantee cannot be compromised by manipulation of the outputs, even in the presence of arbitrary outside information. In other words, differentially private systems may be future proof, and their privacy guarantees may not degrade as technology improves or new data from other sources are published.

A "Theorem 2" for invariance under post-processing can be defined as: Let $M: \mathbb{Z}^{*|\mathcal{X}|} \to R$ be a randomized algorithm that is ϵ-differentially private. Let f: R→R' be an arbitrary randomized mapping. Then $f \circ M: \mathbb{Z}^{|*\mathcal{X}|} \to R'$ is ϵ-differentially private. A proof can be found in [22].

Another property that can be used is closure under composition, which means that if mechanism $M_1$ is $\epsilon_1$-differentially private and mechanism $M_2$ is $\epsilon_2$-differentially private, then the combination $M_{1,2}$ is $\epsilon_1 + \epsilon_2$ differentially private.

A "Theorem 3" for composition can be defined as: Let $M_1$ $\mathbb{Z}^{*|\mathcal{X}|} \to R_1$ be $\epsilon_1$-differentially private and $M_2: \mathbb{Z}^{*|\mathcal{X}|} \to R_2$ be $\epsilon_2$ differentially private algorithms. Then the composition algorithm $M_{1,2}: \mathbb{Z}^{*|\mathcal{X}|} \times \mathbb{Z}^{*|\mathcal{X}|} \to R_1 \times R_2$ defined by $M_{1,2}(x) = (M_1(x), M_2(x))$ is $\epsilon_1 + \epsilon_2$-differentially private. Proof can follow from Definition (1), see [22].

In [16] it is argued that formal privacy guarantees such as differential privacy that work well for relational data, may seem too difficult to achieve for time series data. For instance, standard differentially private techniques such as LPA can result in a noise in the order of θ(n) to each query answer, where n is the number of queries to answer, making the query answers practically useless if a long sequence of queries is to be answered.

To remedy this limitation, and answer multiple queries over time-series data under differential privacy, [16] introduces the $FPA_k$ algorithm that perturbs the Discrete Fourier Transform (DFT) of the query answers. For answering n queries, $FPA_k$ improves the error from θ(n) (error of standard differential privacy techniques) to roughly θ(k) where k is the number of DFT coefficients that can (approximately) reconstruct all the n query answers. A brief review of the method is presented below.

Following the exposition in [16], a database I of time series data set of U users and an aggregator can be considered. Each user u's data can be a (uni- or multi-variate) time series data, denoted by $I_u$. Denoting $I = I_1 \cup I_2 \cup \ldots \cup I_U$, the combined time-series data of all users, a goal can be to publish queries of I while guaranteeing differential privacy of individual users. A recurring query is defined as asking for periodic answers about users over time. A recurring query is modeled as sequential query work load $Q = (q_1, \ldots, q_n)$ where each $q_i$ is a snapshot query.

A "Definition 2" for sensitivity for sequential queries can be defined as: If Q is a query sequence, Q(I) and Q(I') are each vectors. Sensitivity then measures the distance between the two vectors. This is typically done using the $L_1$ distance metric, denoted as |Q(I)−Q(I')|, that measures the Manhattan distance $\Sigma_i |q_i(I) - q_i(I')|$ between these vectors. The $L_2$ distance metric, denoted as ‖Q(I)−Q(I')‖, measures the Euclidean distance $\sqrt{\Sigma_i (q_i(I) - q_i(I'))^2}$. With this notion of distance between sequence queries, the notion of sensitivity in Equation (1) can be extended.

A "Definition 3" for LPA for sequential queries can be defined as: The sequence extended LPA algorithm takes as input a query sequence Q and parameter λ, first computes the true answers, Q(I), exactly and then perturbs the answers by adding independent Lap(λ) noise to each query answer in Q(I). More formally, it computes and outputs $\tilde{Q} = Q(I) + Lap^n(\lambda)$.

Similar to the scalar case, differential privacy may be guaranteed if the parameter λ of the Laplace noise is calibrated according to the $L_1$ sensitivity of Q. More precisely, as defined in "Theorem 4": For the sequence query $Q = (q_1, \ldots, q_n)$, LPA(Q,λ) is ϵ-differentially private for $\lambda = \Delta_1(Q)/\epsilon$. A proof can be found in [16].

Note that for each LPA-perturbed snap query, the expected error is given by $E[|\tilde{q} - q|] = E[Lap(\lambda)] = \lambda$. For the query sequence $Q = (q_1, \ldots, q_n)$, the error is given by $E[|\tilde{Q} - Q|] = \Delta_1(Q)/\epsilon$.

To answer Q with smaller error under differential privacy, Fourier Perturbation Algorithm $FPA_k$ is based on compressing the answers, Q(I), of the query sequence using an orthonormal transformation. This means finding a k-length query sequence $F_k = F_1^k, \ldots, F_k^k$, where k<<n, such that the answers, $F^k(I)$, can be used to approximately compute Q(I). Then $F_k(I)$ can be perturbed instead of Q(I) using a lower noise (the noise actually reduces by a factor of n/k) while preserving differential privacy.

An additional error creeps in since $F_k(I)$ may not be able to reconstruct Q(I) exactly, but for the right choice of $F^k$, this reconstruction error can be significantly lower than the perturbation error caused by adding noise directly to Q(I). A $F^k$ can be found using Discrete Fourier Transform (DFT) in embodiments herein.

The DFT of a n-dimensional sequence X is a linear transform giving another n-dimensional sequence, DFT(X), with $j^{th}$ element given as:

$$DFT(X)_j = \sum_{i=1}^{n} e^{\frac{-2\pi\sqrt{-1}}{n} ij} X_i. \quad (4)$$

Similarly the Inverse DFT (IDFT) can be computed as, $$IDFT(X)_j = \sum_{i=1}^{n} e^{\frac{2\pi\sqrt{-1}}{n} ij} X_i \quad (5)$$

with the property, IDFT(DFT(X))=X.

$DFT_k(X)$ can be denoted as the first k elements of DFT(X). The elements of $DFT_k(X)$ are called the Fourier coefficients of the k lowest frequencies and they compactly represent the high-level trends in X. An approximation X' to X can be obtained from $DFT_k(X)$ as follows: Denoting $PAD_n(DFT_k(X))$ the sequence of length n obtained by appending n−k zeros to $DFT_k(X)$, compute X'=IDFT(PAD$_n$(DFT$_k$(X))).

X' may be different from X, as ignoring the last n−k Fourier coefficients may introduce some error. $RE_i^k(X)$ can be denoted short for reconstruction error at the $i^{th}$ position, to be the value $|X'_i - X_i|$.

A "Definition 4" for $FPA^k$ (Inputs: sequence Q, parameter $\lambda$) can be defined as:

Compute $F^k = DFT_k(Q(I))$

Compute $\tilde{F}^k = LPA(F^k, \lambda)$ output $\tilde{Q} = IDFT(PAD_n(\tilde{F}^k))$.

FPA begins by computing a sequence $F^k$, comprising the first k Fourier coefficients in the DFT of Q(I). Then it perturbs $F^k$ using the LPA algorithm with parameter to compute a noisy estimate $\tilde{F}^k$. The perturbation may guarantee differential privacy. Finally, the algorithm computes the inverse DFT of $PAD_n(\tilde{F}^k)$ to get $\tilde{Q}^k$, an approximation to the original query answers Q(I).

As with LPA, the parameter $\lambda$ in $FPA_k$ can be adjusted in order to get $\epsilon$-differential privacy. Since $FPA_k$ perturbs the sequence $F^k$, can be calibrated according to the $L_1$ sensitivity, $\Delta_1(F^k)$, of $F^k$. The following result of [16] gives the value of $\lambda$ that makes $FPA^k(Q,\lambda)$ differentially private.

A "Theorem 5" can be defined as: FPA(Q, $\lambda$) is $\epsilon$-differentially private for $\lambda = \sqrt{k}\Delta_2(Q)/\epsilon$. A proof can be found in [16].

Note that the main ingredient of the proof of the above theorem is the isometry property of the Fourier transform. $FPA^k$ applies LPA on a length-k sequence. Hence the noise added during perturbation should be smaller. On the other hand, ignoring n–k DFT coefficients in $FPA^k$ results in an additional (but often much smaller) reconstruction error (see [16] for the exact characterization of the error).

Sparse coding techniques, or dictionary learning, can be used in applications such as image processing, audio processing, visual recognition, clustering and machine learning ([1][3][4]).

An underlying concept of dictionary learning is in the assumption that signals have significant common statistical structures and can therefore be represented as a combination of a set of simpler signals (basis signals—dictionaries). Consequently, the task of dictionary learning algorithms is to find this set of basis signals (dictionary) from a given set of signals (data), where each element of this set of basis signals is called a dictionary element (or atom).

The problem of trying to represent a single signal using a dictionary may have multiple solutions. One criterion for choosing a solution is that of sparsity, which is supported by the evidence of sparse coding in many biological and natural systems. A sparse dictionary method attempts to use as few dictionary elements as possible to represent each signal. Such a sparse representation encourages a simple representation of the signal being modeled.

In dictionary learning (DL) a collection of atomic signals called "dictionary atoms" are learned from a set of training data so that the data can be represented as linear combinations of few atoms. Given training data in $\mathbb{R}^d$, and positive integers m, s, dictionary learning finds a d×m matrix D and s-sparse vectors $\gamma \in \mathbb{R}^m$ such that $D\gamma_i$ is close to $x_i$ for all $i \in \{1, 2, \ldots, n\}$ [32]. Using $\ell_2$ norm to measure the closeness the dictionary learning problem can be formulated as:

$$\min_{D,\gamma_i} \|x_i - D\gamma_i\|_2^2 \text{ such that } \|\gamma_i\|_0 \leq s, \text{ for all } i. \quad (6)$$

Here $D = [d_1, d_2, \ldots, d_m] \in \mathbb{R}^{d \times m}$ is called the dictionary, and its columns represent dictionary atoms. $\gamma_i$ vectors have at most s<<d non-zero entries, containing the coefficients needed by the columns of D to linearly represent $x_i$'s. Since Equation (6) is not convex, it can be relaxed by replacing $\ell_0$ with a convex $\ell_1$ norm to enforce sparsity:

$$\min_{D,\gamma_i} \|\gamma_i\|_1 \text{ such that } \|x_i - D\gamma_i\|_2^2 \leq \zeta \text{ for all } i. \quad (7)$$

Equations (6) and (7) can be solved by iterative updating of $\gamma$ and D [33].

Dictionary learning is closely related to: 1) Compressed sensing (CS), 2) Frame theory, and 3) unsupervised learning. The goal of compressed sensing is to reconstruct a sparse signal from few measurements. Since the natural signals are rarely sparse, a sparsifying transform (such as Wavelet transform) can be used for sparse representation of the signal. In the presence of a sparse signal, compressed sensing can recover the data from few random measurements that are linear combinations of the sparse representation. The major difference between CS and DL is in the definition of D which is a random sensing matrix in CS and is a learned dictionary in DL. Therefore, in CS the projection domain is not specifically optimized for the domain of the signal of interest and to be able to recover the signal number of measurements m should be m≥C×S×log(n). Although the same theoretical bound holds for m in DL, in practice the value of m could be much smaller than CS [34], [32].

The signal recovery error bound of Equation (7) is $$\|x - \hat{x}\|_2 \leq \frac{C_0 \|x - x_s\|_1}{\sqrt{s}} + C_1 \zeta,$$

where $x_s$ is the s-sparse estimation of the signal x (i.e., this term will be zero if the signal is s-sparse), $C_0$ and $C_1$ are some positive constants [34].

Unsupervised learning has been successfully used in image and text domain in order to extract features and latent representations from the samples without the need for labels. Autoencoders can be described as a class of unsupervised learning algorithms based on Neural Network (NN) architectures (see [23] for background on deep learning and [24] for applications in finance) which are designed to transfer the inputs to the output through some (non-linear) reproducing procedure. They are called unsupervised since the algorithm only uses the inputs X for learning.

In an example, an autoencoder transforms an input vector $X \in \mathbb{R}^d$ to a hidden representation $h(X) \in \mathbb{R}^k$ via a mapping $h(x) = g(Wx+b)$. The encoding parameters are included in the weight matrix W which is a k×d dimensional matrix, the vector b is called a bias vector. The mapping g(.) is also called the encoder part of the autoencoder. The decoder component of the architecture maps the obtained hidden representation back to a reconstructed vector $z \in \mathbb{R}^d$ via a mapping $z = k(W^T h(x) + c)$.

Therefore, observation $x_i$ is first mapped to a corresponding $h(x_i)$ and then to a reconstruction $z_i$. Defining $\theta = \{W, b\}$ and $\theta' = \{W^T, c\}$, the optimal parameters of the model can be found by solving, $$\operatorname*{argmin}_{\theta, \theta'} \mathcal{L}(X, \theta, \theta') = \frac{1}{N} \sum_1^N L(x_i, z_i) \quad (8)$$

Here, $L(x_i, z_i)$ is a chosen loss function such as $L^2$ difference $\|x_i - z_i\|^2$. The goal of the autoencoder architecture is to learn an approximation to the identity function. While for some choices of autoencoder architectures, learning identity function is trivial (for instance, when the dimension of the latent space is higher than the original space), by imposing constraints on the network, such as sparsity of the neuron activations, one can discover interesting features of the data (see [29]). In the sparse autoencoder ([11], [26], [28]), a sparse penalty term is added to the autoencoder cost function to penalize the average activation value of the hidden-layer neuron. Let $a_j(x) = h(x_i)_j$ denote the $j^{th}$ activation value. The mean activation value of the $j^{th}$ neuron in the hidden layer is defined by:

$$\rho_j = \frac{1}{N} \sum_{i=1}^{N} a_j(x_i). \tag{9}$$

In order to enforce sparsity, a parameter $\rho$ is chosen and then the KL-divergence is used in order to penalize deviations of $\rho_j$ from $\rho$, $$KL(\rho \| \rho_j) = \rho \log\left(\frac{\rho}{\rho_j}\right) + (1 - \rho) \log\left(\frac{1 - \rho}{1 - \rho_j}\right). \tag{10}$$

The penalty term is called the lifetime sparsity penalty. (Note that KL-divergence is applicable when $a_j \in [0,1]$, such as cases where sigmoid activations are used.) Therefore the learning objective for a sparse autoencoder is of the form, $$\underset{\theta, \theta'}{\operatorname{argmin}} \left\{ \mathcal{L}(X, \theta, \theta') + \beta * \sum_{j=1}^{|L_{hidd}|} KL(\rho \| \rho_j) \right\}, \tag{11}$$

where $|L_{hidd}|$ is the number of neurons in the hidden layer and is the regularization hyper-parameter.

The above framework is known to have a few drawbacks such as difficulty of hyper-parameter tuning of $\beta$ coefficient in order to properly learn a sparse autoencode. In addition, the lifelong sparsity penalty term based on KL-divergence can only be evaluated for neural architectures with sigmoid activation, whereas majority of the modern NN architectures are built on ReLU activations. Based on the above observed limitation, Winner Takes All (WTA) autoencoder was introduced in [11].

Following the exposition in [11], the WTA autoencoder is a non-symmetric autoencoder where the encoding stage is typically a stack of several ReLU layers and the decoder is a linear layer. In the feedforward phase, after computing the hidden codes of the last layer of the encoder, rather than reconstructing the input from all of the hidden units, for each hidden unit, a lifetime sparsity is enforced by keeping the k percent largest activation of that hidden unit across the mini-batch samples and setting the rest of activations of that hidden unit to zero. In the back-propagation phase, only the error through the k percent non-zero activations are back-propagated. In other words, the mini batch statistics are used to approximate the statistics of the activation of a particular hidden unit across all the samples, and finding a hard threshold value for which a k percent lifetime sparsity rate can be achieved.

In some embodiments disclosed herein, a WTA-autoencoder was used in order to achieve differentially private latent feature learning.

Embodiments of systems and methods for dictionary learning based differential privacy (DPDL), disclosed herein, apply dictionary learning to represent time-series data in a sparse latent space.

In some embodiments, DPDL achieves differential privacy by perturbing sparse latent coefficients with calibrated Laplace noise. Due to the sparsity of the latent space, noise is added to m $\propto$ log(n) coefficients in DPDL, rather than n data points in the LPA. Consequently, the same level of privacy may be reached with a much smaller reconstruction error $\propto$ log(n)/$\epsilon$.

To find the optimum dictionary atoms and the associated sparse representation (latent coefficients), Equation (6) or (7) may be solved. Instead of solving these equations directly, a sparse autoencoder may be used, for example, a Winner Take All-based autoencoder can be used, where the dictionary and the latent coefficients are optimized by training the autoencoder using an Adam optimizer [36]. Adam is an algorithm for first-order gradient-based optimization of stochastic objective functions, based on adaptive estimates of lower-order moments.

FIG. 1 illustrates a system 100 for dictionary learning-based differential privacy (DPDL), in an embodiment.

As illustrated in FIG. 1, system 100 includes an autoencoder 102 to generate a sparse signal representation (using dictionary learning) and reconstruct an output, and a privatizer 104 to apply differential privacy.

Input data (such as time-series data), sparse representations, and dictionaries may be stored in a suitable data store.

Differential privacy and sparse dictionary learning techniques disclosed herein may be used when data privacy is needed, for example, as training data for modeling and data sharing.

Components of system 100 such as input data 110, autoencoder 102, and privatizer 104 may be administered by and visible only to a trusted curator.

Input data 110, illustrated as "Original Data" in FIG. 1, can include data to be privatized such as time-series data represented as a series query.

In some embodiments, system 100 includes an autoencoder 102, or sparse autoencoder such as a WTA-autoencoder, to perform sparse dictionary learning. Other suitable autoencoders or dictionary learning techniques can also be used to generate a sparse representation.

In some embodiments, system 100 represents input data 110 (a signal) with dictionary learning, performed by autoencoder 102, in multiple stages:
(1) learning the dictionaries, for example, by solving the optimization problem in equation (12);
(2) projecting the signal on the learned dictionaries, which represents the signal in a sparse way with coefficients;
(3) processing the coefficients; and
(4) reconstructing the signal with the processed coefficients and the dictionaries.

Stages (1) to (4) performed by autoencoder 102 may be used to calibrate a dictionary to data such as time-series data.

As illustrated in FIG. 1, autoencoder 102 can include an encoder 112 and a decoder 113.

Encoder 112 can be configured to perform dictionary learning to construct a sparse representation 130 (also known as sparse coding) of input data 110, in some embodiments, using sparse dictionary learning techniques. In some embodiments, sparse representations 130 are in the form of a linear combination of basic elements as well as those basic elements themselves. The basic elements are called atoms and they compose a dictionary.

Encoder 112 can be configured to present input data 110 in a sparse way, for example, represented with few large coefficients or elements, and lots of zeroes, with a sparse domain.

Encoder 112 can generate a sparse representation 130 of sparse latent coefficients, and sparse representation 130 constructed by encoder 112 may include a linear combination of only a few atoms of the dictionary learned from the input data itself.

In some embodiments, given a set of signals $Y=\{y_1, y_2, \ldots, y_p\}$ as input data 110, autoencoder 102 finds a dictionary $D=\{d_1, d_2, \ldots, d_m\}$ and a sparse representation 130 $C=\{c_1, c_2, \ldots, c_p\}$ such that each signal $y \in Y$ can be well-approximated by a linear combination of $\{d_j\}_{j=1}^{m}$, i.e., $y=\Sigma_{i=1}^{m} c_i d_i$, and most coefficients $c_i$ are zero or close to zero.

Sparse coding performed by autoencoder 102 can be formulated, in some embodiments, as the following optimization problem:

$$\min_{D, \{c_i\}_{i=1}^{p}} \sum_{i=1}^{p} \frac{1}{2} \|y_i - Dc_i\|^2 + \lambda \|c_i\|_0, \quad (12)$$

subject to $\|d_i\| = 1$, $1 \le i \le m$

In some embodiments, the dictionary dimension m is larger than the signal dimension n. $\lambda$ can control a trade off between the sparsity and the minimization error.

Use of autoencoder 102 can enable the use of non-linearities of neural networks to learn more efficient signal encodings. In some embodiments, one-dimensional (1D) convolutional layers can be used in both encoder 112 and decoder 113 which can learn the relationship among consecutive signal values across time.

The weights of channels of the 1D-convolutional layer in decoder 113 can act as the dictionary atoms that would be learned, for example, by solving Equation (6). To achieve well-behaved dictionaries, regularizations can be applied on decoder 113 weights, including: 1) the weights are non-negative when the signal is non-negative, 2) the $l_2$ norm of the weights should be minimized during training.

In some embodiments, to increase the robustness of decoder 113 to noise, a Gaussian noise layer is added to the input layer. This layer adds random Gaussian noise to sparse representation 130 (encoded sparse latent coefficients) during training. Therefore, decoder 113 can learn to reduce the reconstruction error in presence of random noise. This robustness may increase the utility of private data 140 (private signals) generated by decoder 113 where Laplace noise 114 is added to the latent coefficients during the privatization mechanism of privatizer 104.

Figures 2A, 2B:
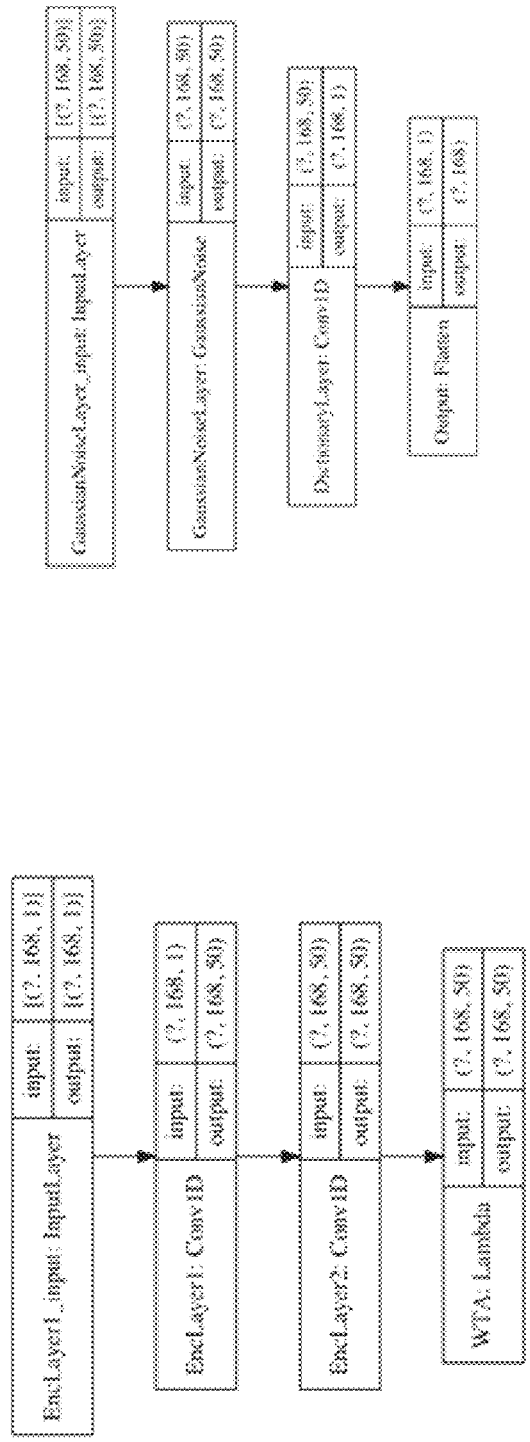
FIG. 2A illustrates a structure of an encoder of an autoencoder, according to an embodiment.
FIG. 2B illustrates a structure of a decoder of an autoencoder, according to an embodiment.

FIG. 2A illustrates a structure of encoder 112 and FIG. 2B illustrates a structure of decoder 113 of an autoencoder 102 embodied as an WTA-autoencoder and used in experimental work, in an embodiment.

In some embodiments, encoder 112 and decoder 113 have 50 channels which is equivalent to have 50 dictionary atoms in D.

FIGS. 2A and 2B illustrate autoencoder 102 applied to data related to the number of times distinct costumers have used their credit cards in different locations (aggregated over four forward sortation areas (FSAs)). FSAs are a way to designate a geographical unit based on the first three characters in a Canadian postal code. Experimental work on this use case is described in further detail below, in which data was collected for four months and split into weekly time-series with hourly time steps (168 hours).

Using the composition theorem, system 100 can add privacy in different levels, creating a differential privacy version of the algorithm by privatizer 104:

(1) adding privacy at the optimization stage while learning the dictionaries, namely adding noise at each step of doing an optimization;

(2) adding noise to the dictionaries; and/or (3) adding noise to the sparse representation of the signal.

In some embodiments, the added noise follows a Laplacian distribution, such as a $$Lap\left(\sqrt{k}\, \frac{\Delta_2(F)}{\epsilon}\right)$$

distribution, where k is the number of non-zero coefficients used to reconstruct the signal.

In some embodiments, privatizer 104 implements a differential privacy mechanism which may be applied to data such as sparse representation 130 generated by encoder 112.

Privatizer 104 may be configured to achieve differential privacy using Laplacian noise injection to the signal, such as through a Laplace mechanism ([2]).

In some embodiments, privatizer 104 applies noise such as Laplace noise 114 to sparse representation 130 to form a noisy sparse representation 130'.

Privatizer 104 can be configured to add Laplace noise to sparse representation 130 (the sparse latent coefficients) using a Laplace Perturbation Algorithm (LPA), LPA($h^k$(Q), $\lambda$), to generate noisy sparse representation 130'. LPA(Q,$\lambda$) may be $\epsilon$-differentially private for $\lambda=\sqrt{k}\Delta_2(Q)/\epsilon$.

$\epsilon$-differential privacy is a mathematical definition for measuring the privacy loss associated with any data release drawn from a dataset, and epsilon, $\epsilon$, is a quantity representing a privacy level. With differential privacy, a goal can be to give each individual roughly the same privacy that would result from having their data removed from the data set.

In some embodiments, to achieve $\epsilon$-differential privacy, the variance of the Laplacian noise, L, added by privatizer 104 is $$2 \times \left(\frac{s}{\epsilon}\right)^2$$

where s is the sensitivity of the query/process f, calculated as $$s = \max_{D_1, D_2} \|f(D_1) - f(D_2)\|_1$$

datasets $D_1$, $D_2$ differing on at most one element. Epsilon, $\epsilon$, may be modified to control the noisiness of the noisy counting; a smaller epsilon produces noisier results and may provide better privacy guarantees.

In some embodiments, privatizer 104 injects calibrated noise to sparse representation 130 of input data 110. Calibrated noise is noise that may be calibrated to 1) the nature of the data set, and 2) the kind of algorithm seeking to privatize.

Other differential privacy mechanisms performed by privatizer 104 are contemplated, including other noise injection techniques such as adding Gaussian noise, exponential mechanism techniques, or other suitable differential privacy mechanisms.

Autoencoder 102, in combination with privatizer 104, generates private data 140, in an example, as a differentially private output sequence. In particular, decoder 113 maps noisy sparse representation 130' to a reconstruction of private data 140.

In use, system 100 can receive input data 110 as an input as a sequence Q, a threshold parameter, and a parameter $\lambda = \sqrt{k} \Delta_2 (Q)/\epsilon$).

Figure 3A:
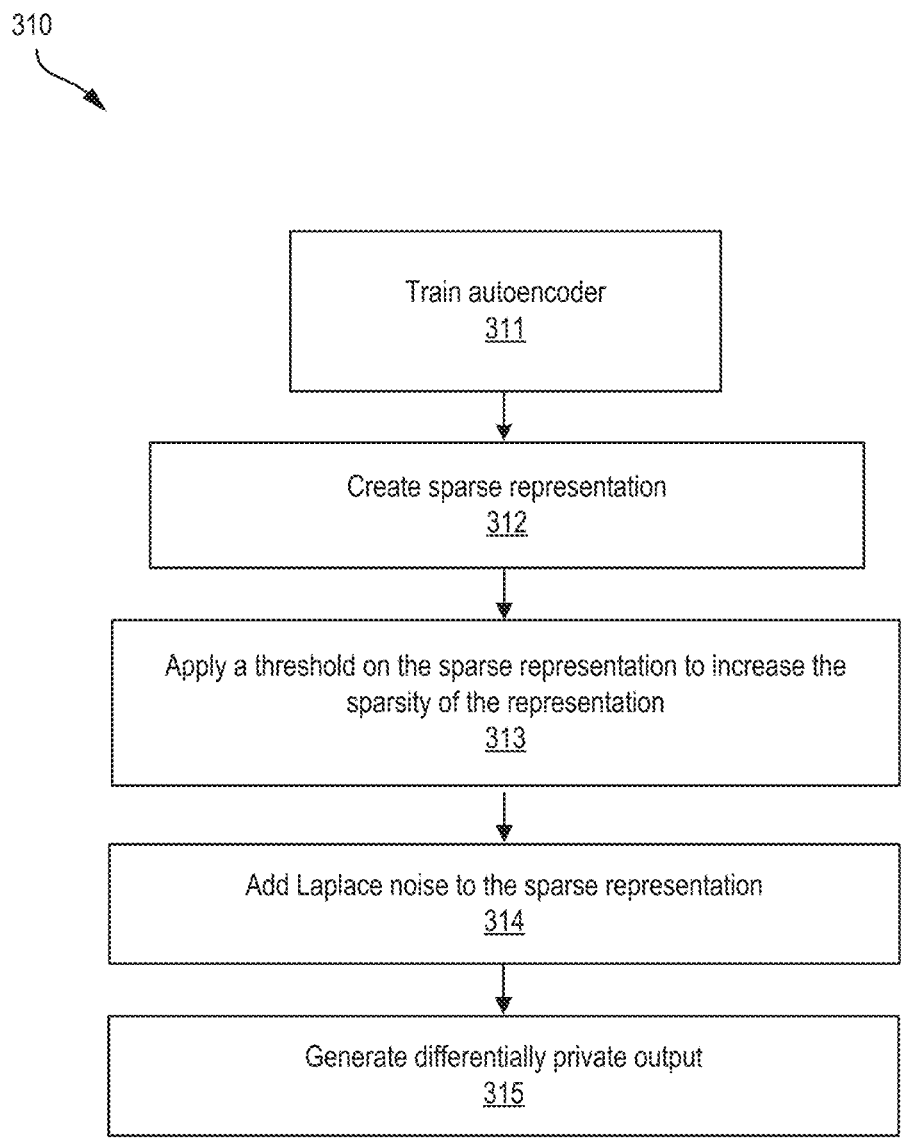
FIG. 3A is a flow chart of a method for differential privacy dictionary learning, according to an embodiment.

FIG. 3A illustrates a flow chart of a method 310 for differential privacy dictionary learning, according to an embodiment, and performed, in an example, by system 100. The steps are provided for illustrative purposes. Variations of the steps, omission or substitution of various steps, or additional steps may be considered.

At block 311, autoencoder 102, in an example, a WTA-Autoencoder, is trained using the data to be privatized or data with similar behaviour. In some embodiments, dictionaries are learned by solving the optimization problem in equation (12).

There are many different methods to learn the dictionaries by solving the optimization problem in Equation (12) ([7], [8], [9]). Using k-sparse autoencoders ([10], [11]) and TensorFlow Privacy framework for TensorFlow ([12][13]) the dictionaries can be learned with a very high accuracy and controllably low privacy budget.

At block 312, encoder 112 creates sparse representation 130 (sparse latent coefficients), in an example, by transforming input $Q \in \mathbb{R}^d$ to a hidden representation $h(Q) \in \mathbb{R}^k$ via a mapping $h(Q)=g(WQ+b)$, where the encoding parameters are included in the weight matrix W which is a k×d dimensional matrix, the vector b is a bias vector.

At block 313, optionally, a threshold can be applied on $h(Q)$ to increase the sparsity of the representations, called $h^k(Q)$.

At block 314, privatizer 104 adds Laplace noise to sparse representation 130 (the sparse latent coefficients) using a Laplace Perturbation Algorithm (LPA), $LPA(h^k(Q),\lambda)$, to generate noisy sparse representation 130'.

At block 315, decoder 113 generates private data 140, as a differentially private output sequence represented as $\hat{Q}=k (LPA(h^k(Q),\lambda))$.

It should be understood that one or more of the blocks may be performed in a different sequence or in an interleaved or iterative manner.

FIG. 3B illustrates a flow chart of a method 320 for privatizing input data, according to an embodiment, and performed, in an example, by system 100. The steps are provided for illustrative purposes. Variations of the steps, omission or substitution of various steps, or additional steps may be considered.

At block 321, an autoencoder such as autoencoder 102 is trained to learn a dictionary, the autoencoder including an encoder such as encoder 112 and a decoder such as decoder 113. Weights of channels in a layer in the decoder define dictionary atoms forming the dictionary.

At block 322, input data is input to the trained autoencoder.

At block 323, the decoder projects the input data on the learned dictionary to generate a sparse representation of the input data, such as sparse representation 130, the sparse representation including coefficients for each dictionary atom.

At block 324, noise is added to the sparse representation to generate a noisy sparse representation such as noisy sparse representation 130', in an example, by privatizer 104.

At block 325, the decoder maps the noisy sparse representation to a reconstructed differentially private output, such as private data 140.

It should be understood that one or more of the blocks may be performed in a different sequence or in an interleaved or iterative manner.

In some embodiments, a method for privatizing input data includes, using autoencoder 102 trained using techniques as disclosed herein: using encoder 112 of autoencoder 102 to generate sparse representation 130, using privatizer 104 to add noise to sparse representation to form noisy sparse representation 130', and using decoder 113 of autoencoder 102 to generate private output 140.

Using a composition theory (Theorem 3), a DPDL privatization process performed by system 100 can be broken down into two steps: 1) private training of autoencoder 102 (in an example, a WTA-autoencoder), and 2) perturbing the sparse latent coefficients (sparse representation generated by autoencoder 102) with calibrated Laplace noise by privatizer 104.

Conveniently, using two-step privatization, autoencoder 102 coefficients may be be differentially private, which may increase immunity to reverse engineering of its weights by an adversary.

It may be assumed, as illustrated in FIG. 1, that the original input data 110 and autoencoder 102, including the WTA-autoencoder weights and private data used to train autoencoder 102, are not visible by anyone other than a trusted curator. However, potential violation of this assumption could result in a data leakage, since autoencoder 102 may be trained using private data and some information of the data can be recovered from the weights. To minimize this risk, a private training procedure may be used, such as that proposed in [35].

Thus, in some embodiments, not only is data private, autoencoder 102 itself is also private, having learned from private data, and it may not be necessary to limit access to a trusted curator, since privacy has been added to autoencoder 102 itself.

Although using the two-step privatization may reduce the risk of data leakage in a potential violation of the data governance, it may increase reconstruction error.

A private neural training technique may be applied to autoencoder 102 based on adding calibrated Gaussian noise to the back-propagated gradients. A gradient descent or a stochastic gradient descent method, or for example, an implementation of Adam optimization, may be used to solve the optimization problem and noise injected (by privatizer 104) at each step of the stochastic gradient descent to create differential privacy while learning the dictionaries. In some embodiments, training may have features of invariance on post-processing, such that if differential privacy is created in the middle of a modelling process, the differential privacy will survive subsequent steps.

The accuracy of the private neural network (autoencoder 102 or the WTA-autoencoder in some embodiments) may be less than a non-private model. Consequently, the utility-privacy trade off in different applications may be adjusted based on risk appetite.

Conveniently, adding Gaussian input during training may make autoencoder 102 more robust to unknown noises, which can allow for high accuracy reconstruction to be possible.

Private data 140 generated from the noisy privatized sparse latent coefficient (noisy sparse representation 130') may be $\epsilon$-differentially private following the invariance under post-processing property of differential privacy (see Theorem 2).

Privacy losses can accumulate from repeated applications of additive noise as a differential privacy mechanism ([5], [6]). For example, when two answers are released from two queries to a dataset, the total privacy loss is twice as large, and the privacy guarantee is half as strong. This cumulative property is a consequence of the composition theorem ([5], [6]). In essence, with each new query, additional information about the sensitive data is released. Hence, the composition theorem has a pessimistic view and assumes the worst-case scenario: the same amount of leakage happens with each new response. For strong privacy guarantees, the privacy loss should be small. To ensure a meaningful privacy guarantee, data curators can enforce a maximum privacy loss. If the number of queries exceeds the threshold, then the privacy guarantee becomes too weak and the curator stops answering queries. The maximum privacy loss is called the privacy budget.

Thus, it may be desirable to minimize privacy loss. A smaller privacy loss means the outputs of and algorithm or data set are more private. However, there may be a tension between privacy loss and error rate as a result of injected noise. By reducing privacy loss, noise is injected into the data. The added error rate introduced by the injected noise reduces the fidelity of the data. Thus, it is desirable to seek a reduced privacy loss while maintaining the fidelity of the data.

For time-series data with recordings through time or a histogram with multiple bins, one naïve solution for to achieve $\epsilon$-differential privacy is to add noise to each record. However, in such a situation, the privacy loss accumulates and adding independent noise to each element increases the privacy budget. This is due to a property of differential privacy called additivity, as each query to a sensitive data set increases the privacy loss (epsilon). Time-series data may be challenging to work with, taking into account the large value of privacy loss, depending on the length of the time series. Furthermore, added noise may result in the data (resulting from a query to a sensitive data set) becoming useless for further analytics.

If the number of elements that represent the signal is reduced, the accumulated amount of added noise would be lower. Therefore, more accurate (higher utility) may be achieved and may provide the same privacy guarantees.

In some embodiments, encoder 112 represents sequential input data 110 with significantly fewer elements by application of sparse dictionary learning. Using dictionaries learned from data, the sequential data can be represented in a sparse way, with few non-zero elements. Privatizer 104 can then perform noise injection on the sparse representation. Because of the sparsity, privatizer 104 will thus propagate less noise, preventing too much noise from being injected, while still achieving differential privacy.

System 100 may thus achieve $\epsilon$-differential privacy with sparsely represented data with dictionary learning.

In an example use case of curating (or managing) a sensitive database, it may be desirable to release some statistics from this data to the public. However, it may be desirable to make it difficult for an adversary to reverse-engineer the sensitive data from what is released. An adversary in this case is a party with the intent to reveal, or to learn, at least some of the sensitive data. Differential privacy techniques may be used to provide privacy protection for such revealed information.

Figure 4:
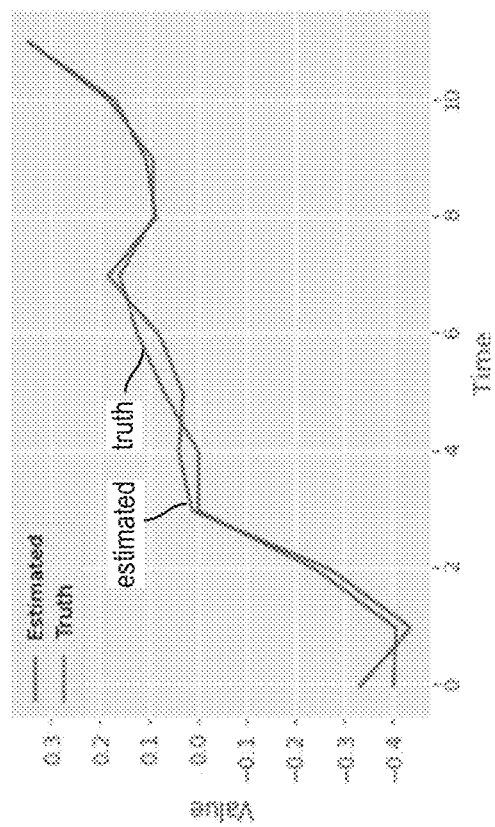
FIG. 4 illustrates two example graphs of time-series signals with actual "truth" values of the signals and resulting "estimated" values following the application of sparse dictionary learning and differential privacy, according to an embodiment.
Figure 4:
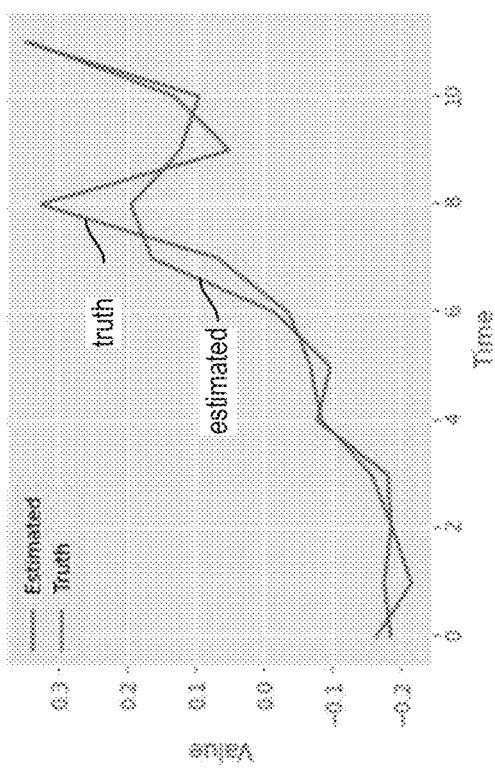

FIG. 4 illustrates two example graphs of time-series signals with actual "truth" values of the signals and resulting "estimated" values following the application of sparse dictionary learning and differential privacy by system 100, according to an embodiment. Input data 110 can be time-series signals such as those illustrated in FIG. 4, may be sequential data such as credit card transactions, debit card transactions, or other financial transactions.

Example input data 110 as time-series signals are illustrated in FIG. 4 with a time length of 12 and values normalized between −1 and +1. The time-series signal ground "Truth" value is shown in the graph. The "Estimated" value is private data 140, the resulting differential privacy pattern data, represented by dictionaries learned from data and reconstructed by autoencoder 102 with only three non-zero coefficients. Thus, the signal pattern is expressed as a superposition of three dictionaries (atoms). In the examples shown in FIG. 4, differential privacy was applied by privatizer 104 using E (epsilon) having a value of one.

Figure 5:
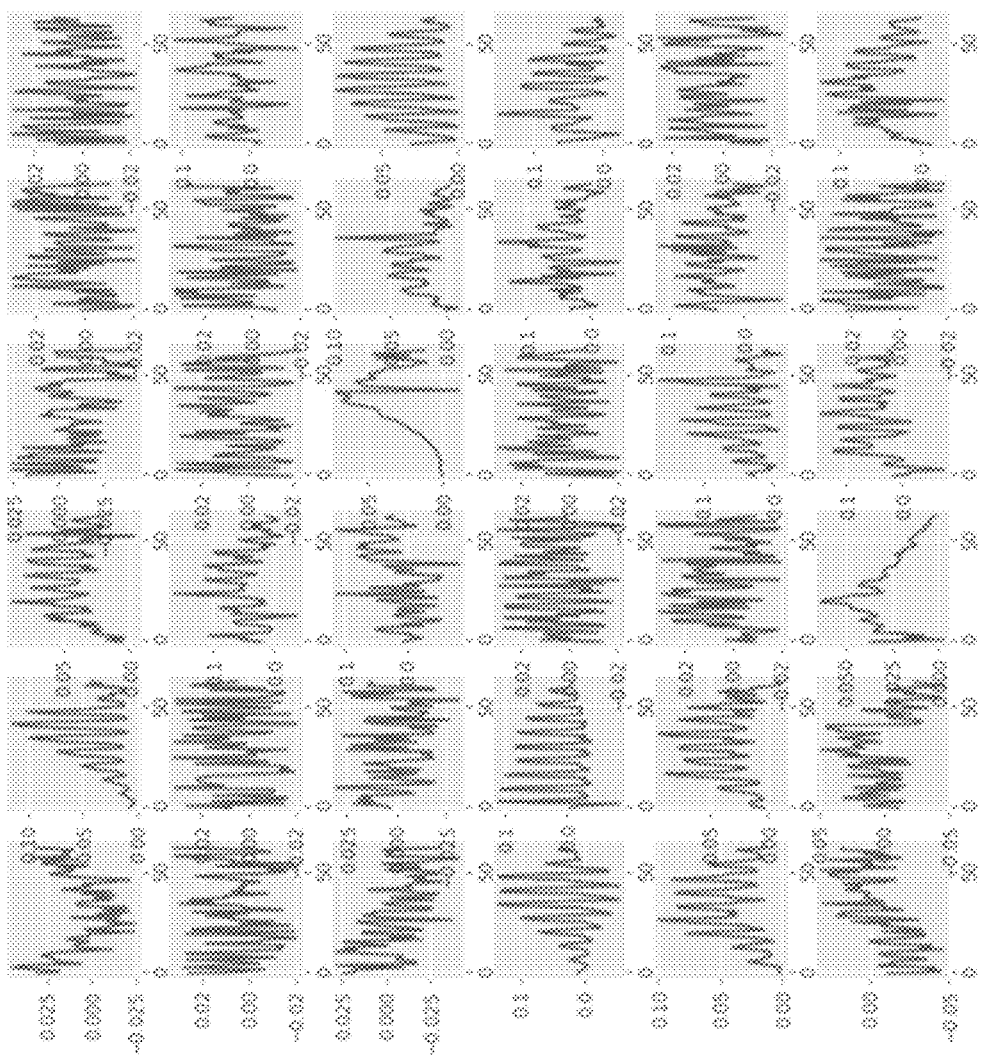
FIG. 5 illustrates examples of dictionaries learned using k-sparse autoencoders, according to an embodiment.
Figure 6:
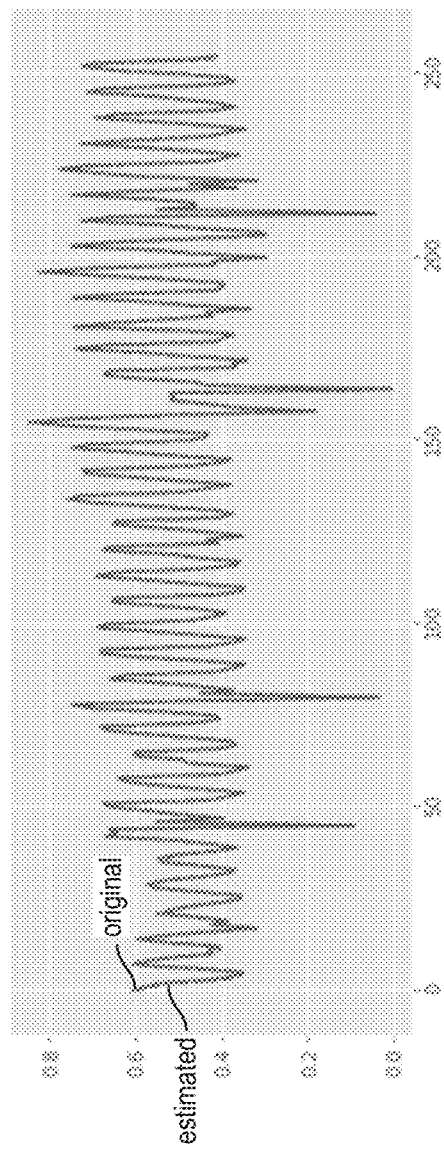
FIG. 6 illustrates an original signal and an estimated signal, using learned dictionaries, according to an embodiment.

FIG. 5 illustrates examples of dictionaries learned using k-sparse autoencoders as an embodiment of autoencoder 102, from aggregated credit card expenditures. FIG. 6 illustrates an original signal, input data 110, and an estimated signal, sparse representation 130, generated using the learned dictionaries of autoencoder 102. Only 25% of the coefficients are non-zero (75% compression) which results in a significant privacy budget saving.

An embodiment of autoencoder 102 based on the structure of WTA-autoencoder illustrated in FIGS. 2A and 2B has been used in experimental work on a use case.

Figure 7:
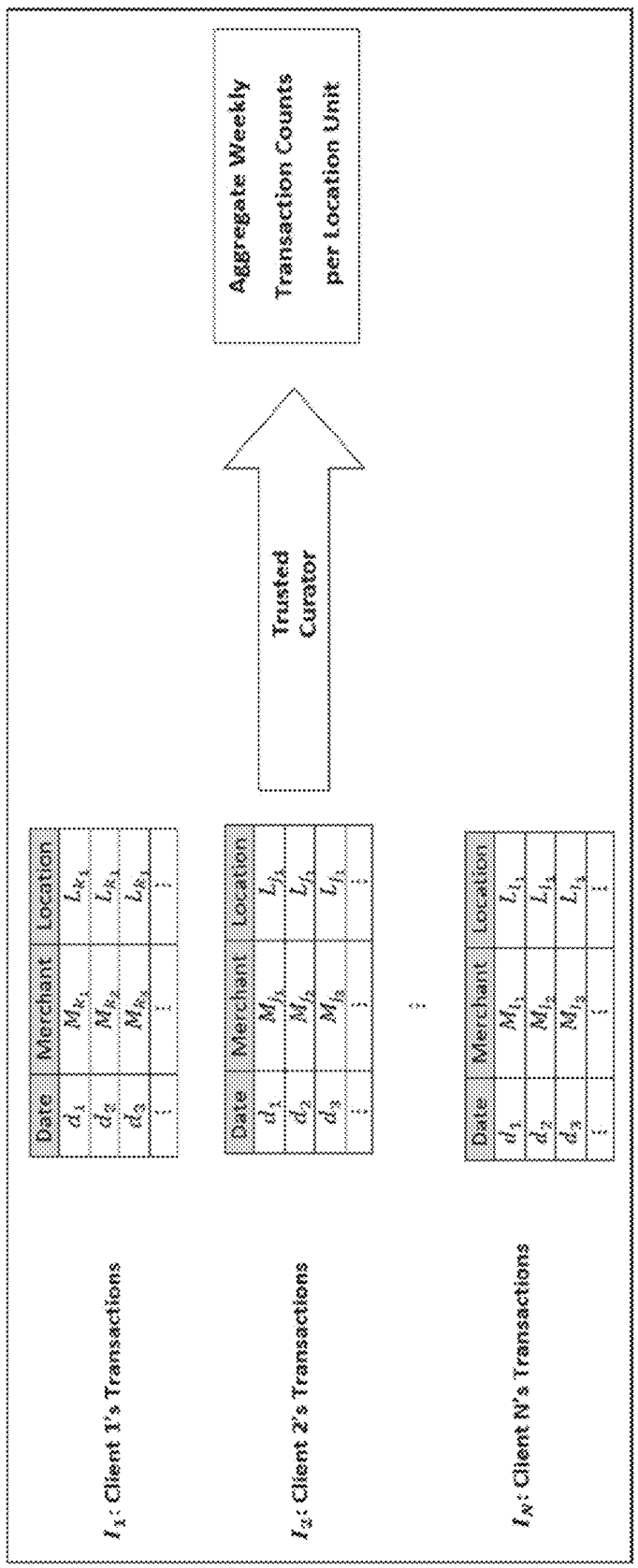
FIG. 7 illustrates microdata schema of a dataset to be privatized, according to an embodiment.

The use case considers the privacy risk (based on considering "who would be harmed?"), for individuals in a sensitive cards transaction dataset containing the time-stamped records of their credit card transactions at physical merchant locations. The current use case is an example of a participatory data mining task. Namely, time series traces of clients are observed over time (panel data) and is held in a private database. In the use case considered, a trusted curator is tasked with releasing aggregate count statistics for each location unit (FSA) based on microdata in a sensitive dataset privacy guarantees (for instance, against re-identification) may be provided to each participating individual. FIG. 7 illustrates microdata schema of the sensitive dataset containing the time stamped records of client's spending at various merchants. The trusted curator releases aggregate weekly statistics at merchant or FSA level.

Time series stamping of individual client data is a unique characteristic that makes existing (cross-sectional) privacy mechanisms inadequate, since successive timestamps from the same source can be highly correlated. This correlation can cause answers to different queries over time series data to also become correlated, e.g., a sequence of queries computing the average weight of a community at successive weeks.

Aiming for differential privacy for each individual card holder, calibrated noise is injected to the time series of aggregate count queries per location unit, so the aggregate card spending per location output is essentially insensitive to the presence of each individual client in the dataset. Therefore, the goal of this use case is to implement differential privacy to enable third parties to compute useful aggregates over, while guaranteeing the privacy of, the data from individual clients. An outstanding policy question for consideration is how to set the privacy budget parameter in the differential privacy algorithm (i.e., the bank's privacy risk appetite).

The sample dataset used for this use case consists of aggregate number of distinct costumers (cards) who have had transactions per FSA time-stamped by hour. The missing values are filled using forward fill. It is noteworthy that in this case the sensitivity (maximum change in the aggregated data excluding an individual) for each time step is one. The data is collected for four months (between September 2019 to December 2019) for four different FSAs in the Toronto metropolitan area (M2K, M2N, M5A, M5B). Each of the aggregated time series is split into non-overlapped weekly (168 hour-length) time intervals which results in having 68 week-length time series in total.

Figure 8:
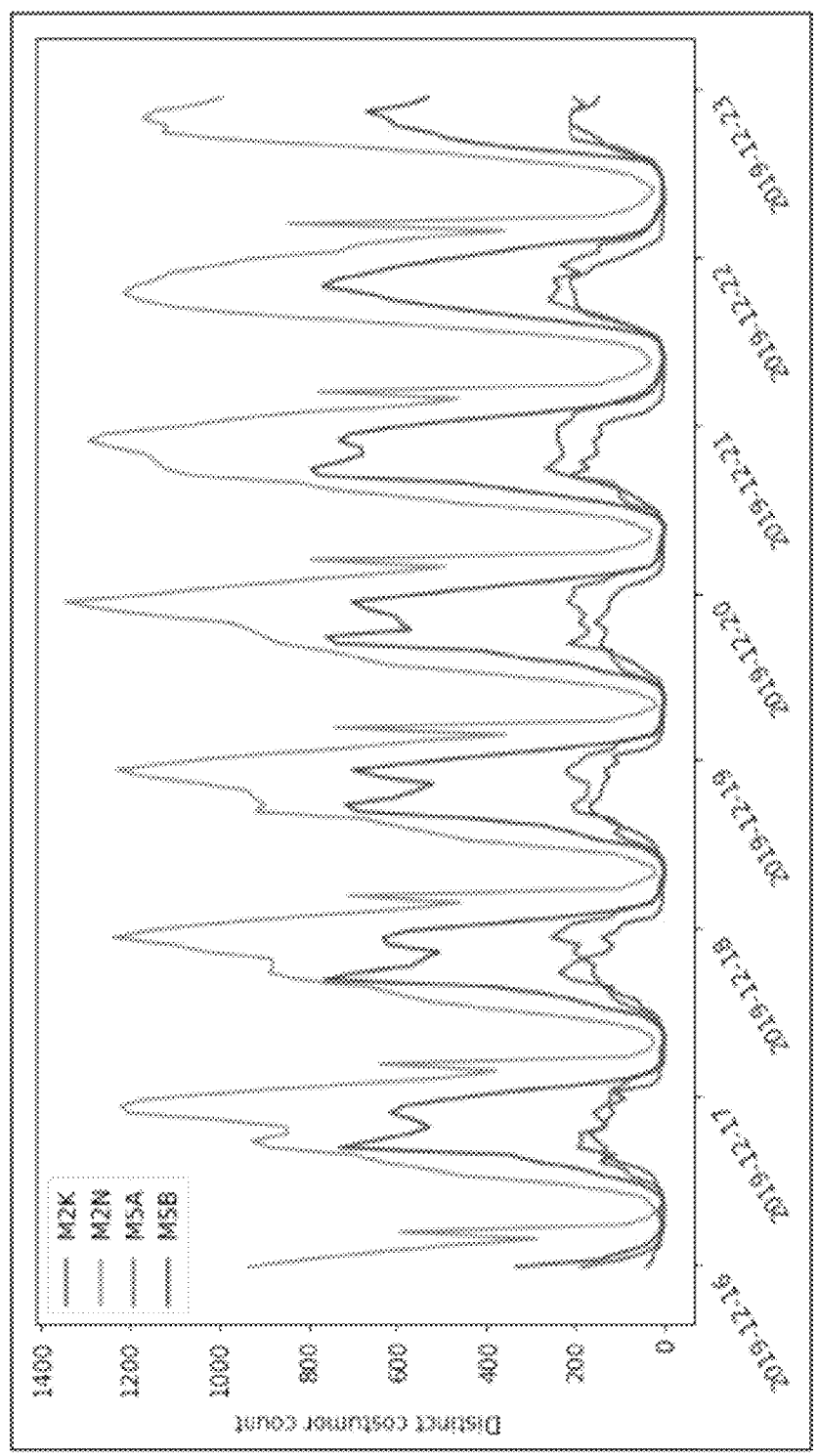
FIG. 8 illustrates a sample of time-series data to be privatized in an example use case, according to an embodiment.
Figure 9:
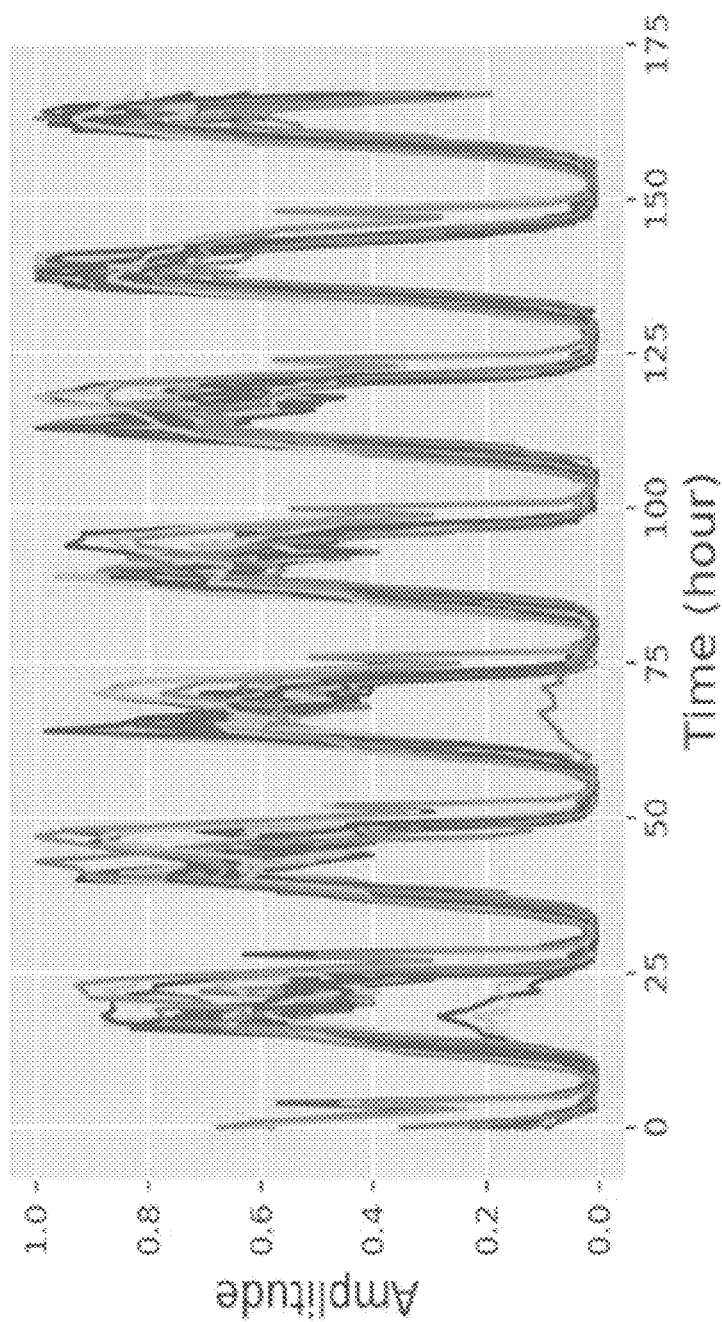
FIG. 9 illustrates normalized data of the data of FIG. 8, according to an embodiment.

FIGS. 8 and 9 show the time-series (and the normalized version) for a sample week for each FSA. FIG. 8 illustrates a sample one-week length time-series for four FSAs. FIG. 9 illustrates examples of normalized time series data.

Figure 11:
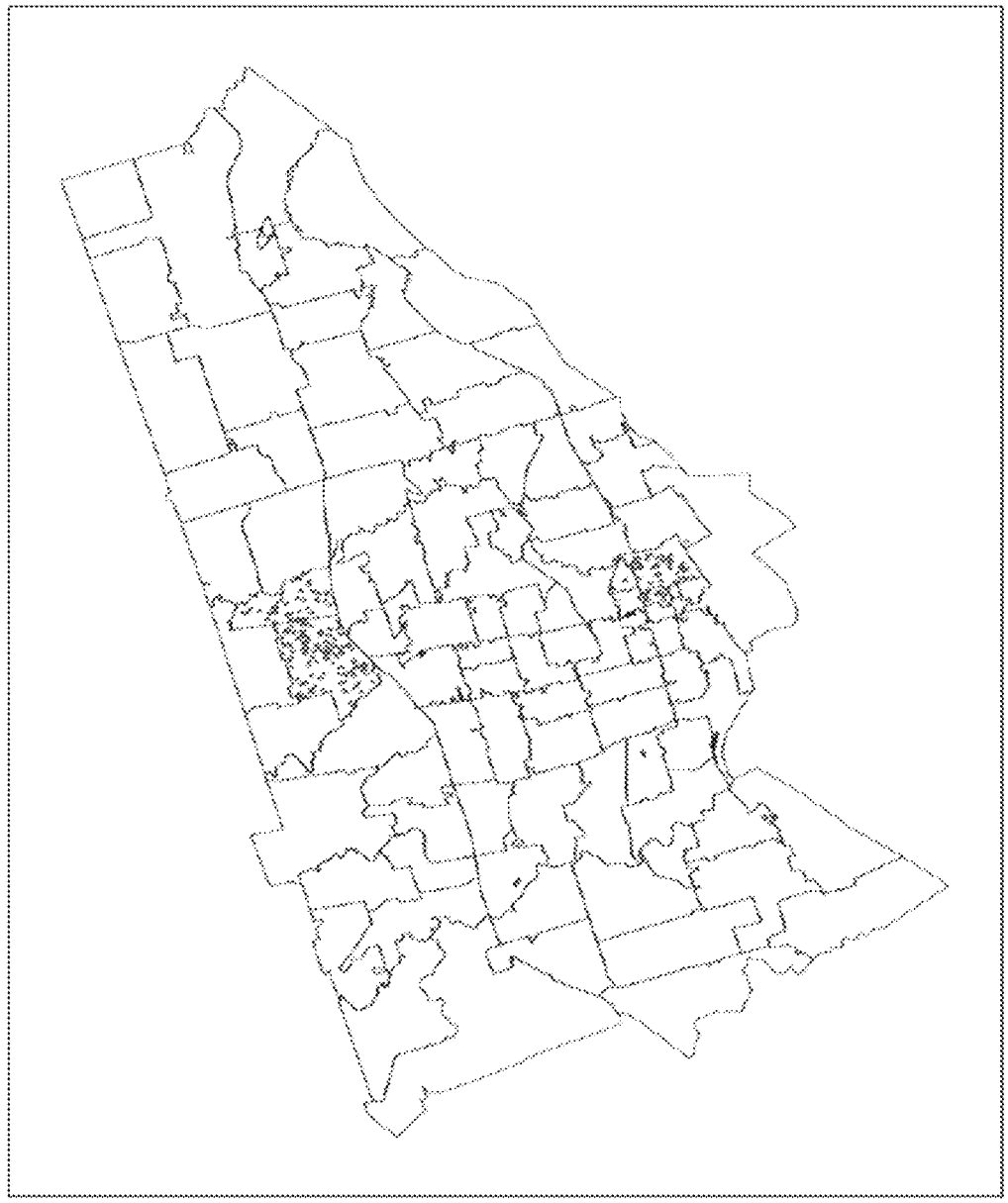
FIG. 11 illustrates geographic characteristics of the data of FIG. 8, according to an embodiment.

FIGS. 10 and 11 summarize some of the characteristics of the use case data set. FIG. 10 illustrates a table of statistics of the use case dataset for each FSA. FIG. 11 illustrates a geographic dispersion of merchants in the use case data on a map of the Toronto metropolitan area, with FSA borders.

Figure 12A:
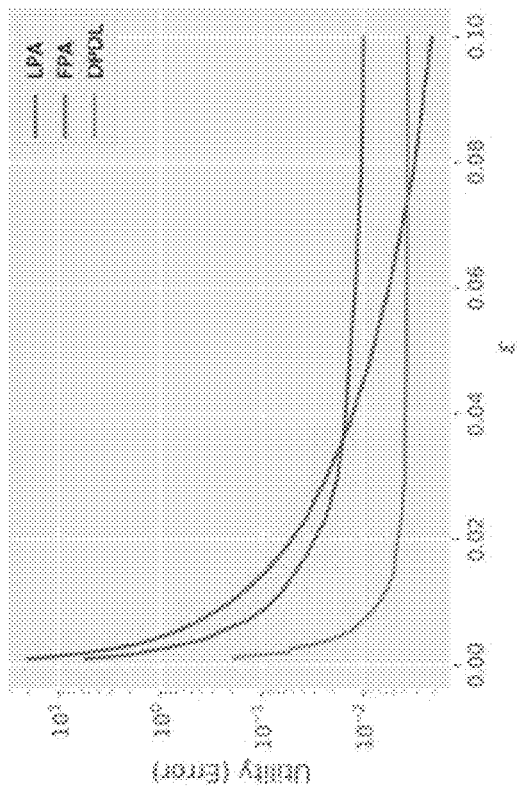
FIG. 12A is a utility versus privacy plot for a non-private autoencoder, according to an embodiment.
Figure 12B:
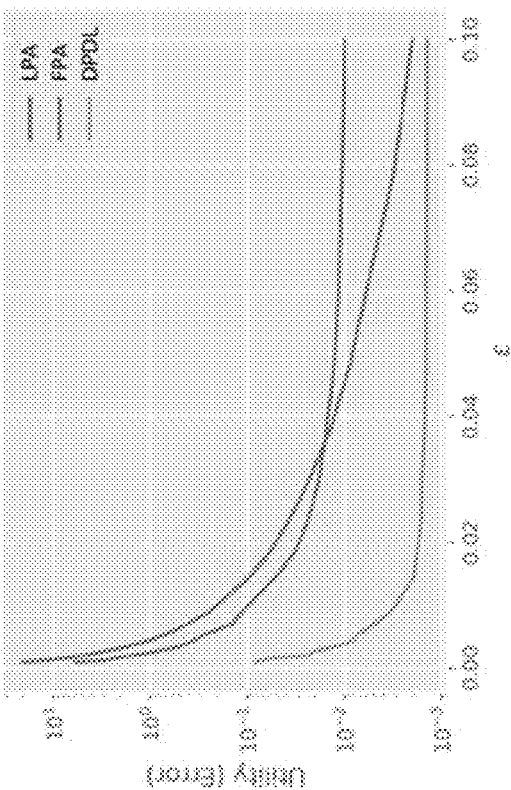
FIG. 12B is a utility versus privacy plot for a two-step private autoencoder, according to an embodiment.

FIG. 12A shows use of a non-private WTA-autoencoder, as compared with FIG. 12B that shows use of two-step privatization with a private WTA-autoencoder, applied to the experimental data described above. FIGS. 12A and 12B illustrate utility versus privacy plots, with reconstruction error (measured by MSE) plotted against E values. Higher E values indicate lower differential privacy, and higher reconstruction error corresponds to lower utility. Each of FIGS. 12A and 12B illustrate a plot for LPA, FPA, and DPDL (an embodiment of the present disclosure).

As can be seen from the plot in FIG. 12B as compared to FIG. 12A, using a private autoencoder can reduce the utility. FPA outperforms LPA in higher noise levels. The number of coefficients of FPA are kept constant across the experiment and is set to k=10 chosen by a grid search to minimize the error across the whole experiment. Using one step privatization (adding noise to sparse latent coefficients) outperforms both LPA and FPA in all privacy budgets.

Figure 13:
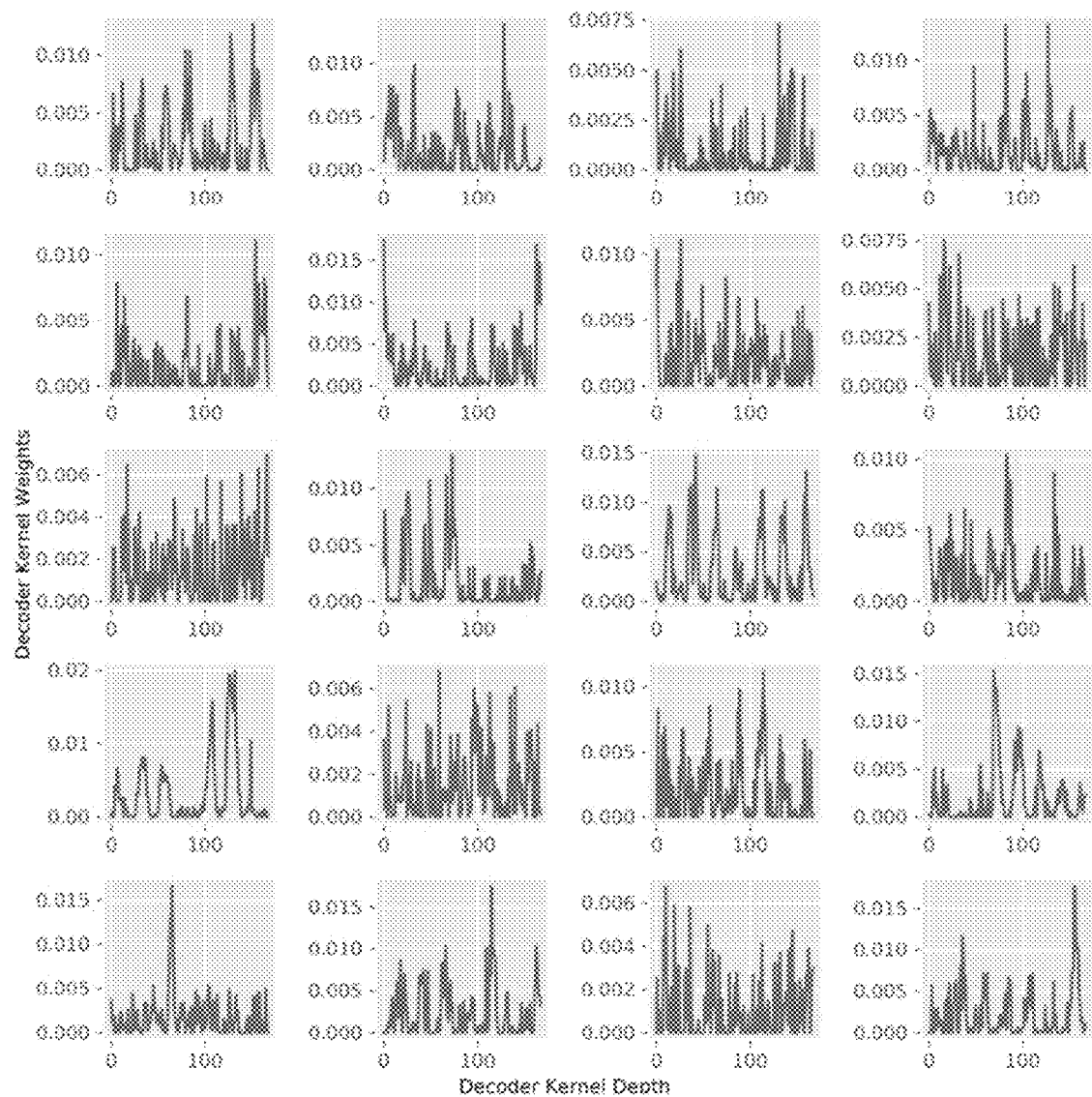
FIG. 13 is a visualization of high level patterns learned by an autoencoder, according to an embodiment.

In two-step privatization (splitting E between WTA-autoencoder by private training and applying Laplace mechanism on the sparse latent coefficients) an embodiment of DPDL outperforms LPA and FPA for $\epsilon<0.075$ by a large margin. For larger E the amount of noise is less than the reconstruction error caused by Fourier truncation in FPA and private dictionary learning reconstruction in an embodiment of DPDL. FIG. 13 is a visualization of high level patterns learned from the data by autoencoder 102 embodied as a WTA-autoencoder, illustrating 20 dictionary atoms (out of 50) learned by WTA-autoencoder.

Figure 14:
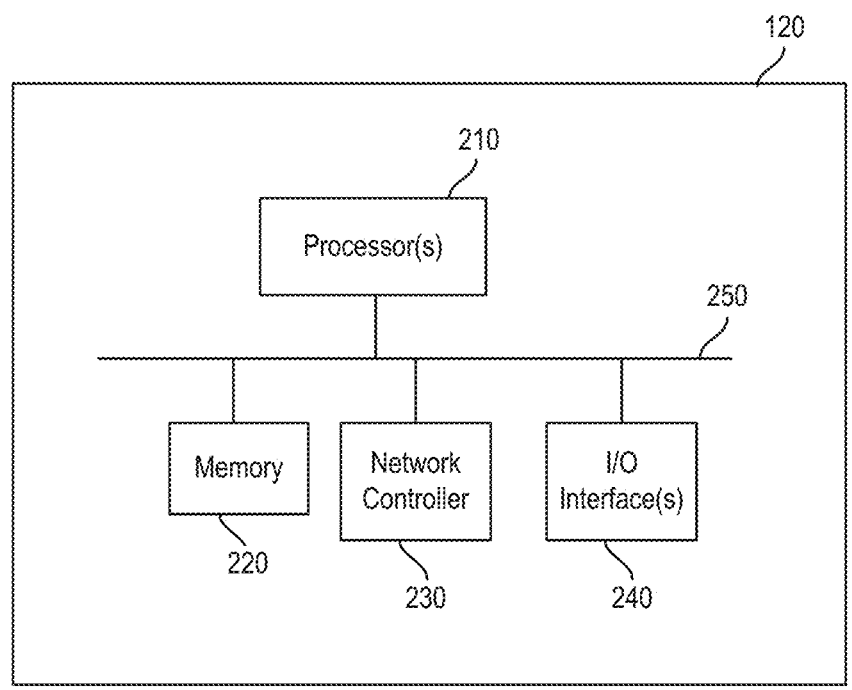
FIG. 14 is a block diagram of example hardware components of a computing device for differential privacy dictionary learning, according to an embodiment.

System 100, in particular, one or more of autoencoder 102 and privatizer 104, may be implemented as software and/or hardware, for example, in a computing device 120 as illustrated in FIG. 14. Method 310, in particular, one or more of blocks 311 to 315, and method 320, in particular, one or more of blocks 321 to 325 may be performed by software and/or hardware of a computing device such as computing device 120.

As illustrated, computing device 120 includes one or more processor(s) 210, memory 220, a network controller 230, and one or more I/O interfaces 240 in communication over bus 250.

Processor(s) 210 may be one or more Intel x86, Intel x64, AMD x86-64, PowerPC, ARM processors or the like.

Memory 220 may include random-access memory, read-only memory, or persistent storage such as a hard disk, a solid-state drive or the like. Read-only memory or persistent storage is a computer-readable medium. A computer-readable medium may be organized using a file system, controlled and administered by an operating system governing overall operation of the computing device.

Network controller 230 serves as a communication device to interconnect the computing device with one or more computer networks such as, for example, a local area network (LAN) or the Internet.

One or more I/O interfaces 240 may serve to interconnect the computing device with peripheral devices, such as for example, keyboards, mice, video displays, and the like. Such peripheral devices may include a display of device 120. Optionally, network controller 230 may be accessed via the one or more I/O interfaces.

Software instructions are executed by processor(s) 210 from a computer-readable medium. For example, software may be loaded into random-access memory from persistent storage of memory 220 or from one or more devices via I/O interfaces 240 for execution by one or more processors 210. As another example, software may be loaded and executed by one or more processors 210 directly from read-only memory.

Example software components and data stored within memory 220 of computing device 120 may include software to generate a sparse signal representation, apply differential privacy, and reconstruct an output, as described herein, and operating system (OS) software allowing for basic communication and application operations related to computing device 120.

Embodiments of systems and methods for differential privacy dictionary learning disclosed herein can have applicability to generate, from data containing sensitive information, differentially private time series data, allowing such data to be shared between parties or institutions and used to create machine learning models. By providing differential privacy, machine learning algorithms using such data may not be able to recover sensitive information from the data.

Traditional differentially private data often suffers from significant noise such that models trained from such data are ineffective because the amount of noise is so high, and the resulting model is not useful. This drawback is amplified in the context of time-series data in particular, containing a large number of elements, with each time step as a query of data. By contrast, using embodiments as disclosed herein, differential privacy can be obtained while achieving good accuracy of reconstructed private data. Thus, a model trained on private data generated using techniques disclosed herein can generate predictions that are accurate enough to be useful and insightful, and such private data can be shared with other parties or institutions while retaining privacy.

Conveniently, embodiments of systems and methods for differential privacy dictionary learning disclosed herein may provide protections available from a differential privacy mechanism while maintaining a higher utility, which may enable more accurate models with the same level of privacy and improve the quality of private data.

Higher utility may be achieved since basis functions are learned from the data itself, unlike Fourier basis which are general. In addition, Fourier coefficients are not generally sparse, so by cutting some coefficients to zero, the reconstruction error is highly increased. However, in dictionary learning, the dictionaries are learned such that the signal representation in the dictionary domain is sparse. Therefore, the reconstruction error is lower, and as a result the accuracy and usefulness of the reconstructed signal is higher. Because a signal is a sparse representation, by applying differential privacy, for example, by anonymizing the data and adding noise, it may be possible to maintain higher level of fidelity to original data.

Thus, systems and methods disclosed herein may add noise to achieve the safeguards of differential privacy, but while maintaining a higher level of fidelity to the original data.

The differential privacy dictionary learning mechanism of systems and methods disclosed herein may allow less noise than previous synopsis proposals under certain conditions, and may provide more accurate statistical query results after decoding. Unlike previous methods that focus on specific classes of queries, the differential privacy dictionary learning techniques disclosed herein may be universal, supporting many possible (e.g., offline and online) queries on decoded noisy data. Thus, systems and methods described herein may be seamlessly incorporated into many applications that have privacy concerns and provide high quality anonymous data as applicable in various industries.

Of course, the above described embodiments are intended to be illustrative only and in no way limiting. The described embodiments are susceptible to many modifications of form, arrangement of parts, details and order of operation. The disclosure is intended to encompass all such modification within its scope, as defined by the claims.

REFERENCES

[1] Kreutz-Delgado, Kenneth, et al. "Dictionary learning algorithms for sparse representation." Neural computation 15.2 (2003): 349-396.
[2] Dwork C. (2006) Differential Privacy. In: Bugliesi M., Preneel B., Sassone V., Wegener I. (eds) Automata, Languages and Programming. ICALP 2006. Lecture Notes in Computer Science, vol 4052. Springer, Berlin, Heidelberg.
[3] Ramirez, Ignacio, Pablo Sprechmann, and Guillermo Sapiro. "Classification and clustering via dictionary learning with structured incoherence and shared features." 2010 IEEE Computer Society Conference on Computer Vision and Pattern Recognition. IEEE, 2010.
[4] Dong, Weisheng, et al. "Sparsity-based image denoising via dictionary learning and structural clustering." CVPR 2011. IEEE, 2011.
[5] Martin Abadi, Andy Chu, Ian Goodfellow, H. Brendan Mcmahan, Ilya Mironov, Kunal Talwar, and Li Zhang. Deep learning with differential privacy. Proceedings of the 2016 ACM SIGSAC Conference on Computer and Communications Security—CCS16, 2016.
[6] Frank D. McSherry. Privacy integrated queries: An extensible platform for privacy-preserving data analysis. In Proceedings of the 2009 ACM SIGMOD International Conference on Management of Data, SIGMOD '09, pages 19-30, New York, NY, USA, 2009. ACM.
[7] Mukherjee, Subhadip, Rupam Basu, and Chandra Sekhar Seelamantula. "l1-K-SVD: A robust dictionary learning algorithm with simultaneous update." Signal Processing 123 (2016): 42-52.
[8] Tropp, Joel A. "Greed is good: Algorithmic results for sparse approximation." IEEE Transactions on Information theory 50.10 (2004): 2231-2242.
[9] Jenatton, Rodolphe, et al. "Proximal Methods for Sparse Hierarchical Dictionary Learning." ICML. Vol. 1. 2010.
[10] Makhzani, Alireza, and Brendan Frey. "K-sparse autoencoders." arXiv preprint arXiv:1312.5663 (2013).
[11] Makhzani, Alireza, and Brendan J. Frey. "Winner-take-all autoencoders." Advances in neural information processing systems. 2015.
[12] McMahan, H. Brendan, and Galen Andrew. "A General Approach to Adding Differential Privacy to Iterative Training Procedures." arXiv preprint arXiv:1812.06210 (2018).
[13] Abadi, Martin, et al. "Deep learning with differential privacy." Proceedings of the 2016 ACM SIGSAC Conference on Computer and Communications Security. ACM, 2016.
[14] Barak, Boaz, et al. "Privacy, accuracy, and consistency too: a holistic solution to contingency table release." Proceedings of the twenty-sixth ACM SIGMOD-SIGACT-SIGART symposium on Principles of database systems. ACM, 2007.
[15] Lyu, Min, Dong Su, and Ninghui Li. "Understanding the sparse vector technique for differential privacy." Proceedings of the VLDB Endowment 10.6 (2017): 637-648.
[16] Rastogi, Vibhor, and Suman Nath. "Differentially private aggregation of distributed time-series with transformation and encryption." Proceedings of the 2010 ACM SIGMOD International Conference on Management of data. ACM, 2010.
[17] Xiao, Xiaokui, Guozhang Wang, and Johannes Gehrke. "Differential privacy via wavelet transforms." IEEE Transactions on knowledge and data engineering 23.8 (2010): 1200-1214.
[18] Li, Yang D., et al. "Compressive mechanism: Utilizing sparse representation in differential privacy." Proceedings of the 10th annual ACM workshop on Privacy in the electronic society. ACM, 2011.
[19] Yang Cao and Masatoshi Yoshikawa and Yonghui Xiao and Li Xiong. *Quantifying Differential Privacy under Temporal Correlations*, IEEE 33rd International Conference on Data Engineering (ICDE), 2017.
[20] Guo-An Chen, Deanna Needell. *Compressed Sensing and Dictionary Learning*, 2014.
[21] Yves-Alexandre de Montjoye, Laura Radaelli, Vivek Kumar Singh, Alex "Sandy" Pentland. *Unique in the shopping mall: On the reidentifiability of credit card metadata*, Science, Vol. 347, p. 536-539, 2015.
[22] Dwork, Cynthia, Roth, Aaron. *The The Algorithmic Foundations of Differential Privacy*, Found. Trends Theor. Comput. Sci, Vol. 9, number 3-4, p. 211-407, 2014.
[23] Ian Goodfellow, Yoshua Bengio, Aaron Courville. *Deep Learning*, MIT Press, 2017.
[24] Greg Kirczenow, Masoud HAshemi, Ali Fathi, Matt Davison. *Machine Learning for Yield Curve Feature Extraction: Application to Illiquid Corporate Bonds*, ArXiv, 1812.01102, 2018.
[25] Yang D. Li, Zhenjie Zhang, Marianne Winslett, Yin Yang. *Compressive mechanism: utilizing sparse representation in differential privacy*, ArXiv, 1107.3350, 2011.
[26] Aharon Michal, Michael Elad. *Overcomplete dictionaries for sparse representation of signals—PhD Dissertation*, 2006.
[27] A. R. Vijaya Narayanan, Joanna Huey, Edward W. Felten. *A Precautionary Approach to Big Data Privacy*, 2016.
[28] Andrew Ng. *Sparse autoencoder, CS294A Lecture notes, vol. 72*, 2011.
[29] Irina Rish, Genady Grabarnik. *Sparse Modeling: Theory, Algorithms, and Applications*, CRC Press, 2014.
[30] Luc Rocher, Julien M. Hendrickx, Yves-Alexandre de Montjoye. *Estimating the success of re-identifications in* incomplete datasets using generative models, Nature Communications, Vol. 10, 2019.

[31] Latanya Sweeney. *Simple Demographics Often Identify People Uniquely*, Working paper, 2000.

[32] Guangliang Chen, Deanna Needell. *Compressed sensing and dictionary learning*, Finite Frame Theory: A Complete Introduction to Overcompleteness, Vol. 73, 2016.

[33] Michal Aharon, Michael Elad. *Overcomplete dictionaries for sparse representation of signals*, Computer Science Department, Technion, 2006.

[34] Emmanuel J Candès, Michael B Wakin, *An introduction to compressive sampling*, IEEE signal processing magazine, Vol. 25, 2008.

[35] Ilya Mironov, *Rényi differential privacy*, 2017 IEEE 30th Computer Security Foundations Symposium (CSF), 2017.

[36] Diederik P Kingma, Jimmy Ba, Adam: *A method for stochastic optimization*, arXiv preprint arXiv:1412.6980, 2014.

What is claimed is:

1. A computer-implemented method for privatizing input data, the method comprising:
   training an autoencoder to provide a two-phase privacy enhancement to time series data inputted into the autoencoder, wherein training an encoder and a decoder of the autoencoder generates coefficients which are differentially private from the inputted time series data providing a first phase of the privacy enhancement, the encoder comprising one or more layers to generate sparse latent coefficients representing the inputted time series data, the decoder comprising a dictionary layer corresponding to a plurality of dictionary atoms for the inputted time series data;
   inputting the input data to the trained autoencoder;
   projecting, using the encoder, the input data to generate an encoded sparse representation of the input data, the encoded sparse representation including coefficients for each of the plurality of dictionary atoms;
   adding noise to non-zero coefficients of the encoded sparse representation to generate a noisy sparse representation; and
   mapping, using the decoder, the noisy sparse representation to a reconstructed differentially private output to provide a second phase of the privacy enhancement subsequent to the first phase of the privacy enhancement.

2. The method of claim 1, wherein the decoder comprises a Gaussian noise layer, and wherein during training, the Gaussian noise layer trains the decoder to reduce reconstruction error caused by random noise.

3. The method of claim 1, wherein the training comprises an Adam stochastic optimization.

4. The method of claim 1, wherein the training comprises regularizing weights of the decoder by setting at least one of the weights non-negative when a signal is non-negative.

5. The method of claim 1, wherein the training comprises regularizing weights of the decoder by minimizing a norm of the weights.

6. The method of claim 1, wherein the training comprises adding second noise at each step of optimization while learning the dictionary.

7. The method of claim 1, wherein the training comprises adding random Gaussian noise at an input layer of the decoder.

8. The method of claim 1, wherein the training is performed using private training data.

9. The method of claim 1, further comprising adding additional noise to a learned dictionary of the decoder.

10. The method of claim 1, wherein the noise has a Laplace distribution.

11. The method of claim 1, wherein the noise is added using a Laplace Perturbation Algorithm.

12. The method of claim 11, wherein a parameter of the Laplace Perturbation Algorithm is calibrated according to a sensitivity of the input data.

13. The method of claim 1, wherein the autoencoder is trained with an autoencoder cost function including a sparse penalty term to penalise an average activation value of a hidden-layer neuron.

14. The method of claim 13, wherein the autoencoder is a Winner Takes All autoencoder.

15. The method of claim 1, further comprising applying a threshold on the encoded sparse representation to increase sparsity.

16. The method of claim 1, wherein the encoder and the decoder each include a number of channels corresponding to a number of dictionary atoms for the input data.

17. The method of claim 1, wherein the decoder comprises one-dimensional convolutional layers.

18. The method of claim 1, wherein during a feedforward phase of the training, a lifetime sparsity is enforced by keeping a largest activation percentage of a hidden unit in the decoder across mini-batch samples, and setting other activations of the hidden unit to zero.

19. A computer system comprising:
   a processor;
   a memory in communication with the processor, the memory storing instructions that, when executed by the processor cause the processor to perform the method of claim 1.

20. A non-transitory computer-readable medium having computer executable instructions stored thereon for execution by one or more computing devices, that when executed perform the method of claim 1.

* * * * *